(12) United States Patent
Kondo et al.

(10) Patent No.: US 7,788,010 B2
(45) Date of Patent: Aug. 31, 2010

(54) CONTROLLING SYSTEM FOR VEHICLE WITH CONTINUOUSLY VARIABLE TRANSMISSION

(75) Inventors: Hiroki Kondo, Aichi-ken (JP); Tadashi Tamura, Aichi-ken (JP); Akira Hino, Toyota (JP); Makoto Sawada, Nisshin (JP); Hiroji Taniguchi, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 135 days.

(21) Appl. No.: 12/036,798

(22) Filed: Feb. 25, 2008

(65) Prior Publication Data

US 2009/0043468 A1 Feb. 12, 2009

Related U.S. Application Data

(63) Continuation of application No. 11/659,804, filed as application No. PCT/JP2005/014790 on Aug. 5, 2005, now abandoned.

(30) Foreign Application Priority Data

Aug. 9, 2004 (JP) ............................. 2004-232784

(51) Int. Cl.
G06F 7/00 (2006.01)
B60W 10/04 (2006.01)

(52) U.S. Cl. .................... 701/61; 701/65; 477/37

(58) Field of Classification Search ............. 701/61, 701/65, 51, 53, 54, 55, 58, 60, 62; 477/37, 477/34, 40, 43, 44, 45, 46, 48, 49
See application file for complete search history.

(56) References Cited

U.S. PATENT DOCUMENTS 4,653,004 A * 3/1987 Osanai et al. ................. 701/62
4,701,853 A 10/1987 Osanai
4,720,793 A * 1/1988 Watanabe et al. ............. 701/54
4,764,155 A * 8/1988 Kumura et al. ................ 474/12
4,823,925 A 4/1989 Ohkumo et al.

(Continued)

FOREIGN PATENT DOCUMENTS

| JP | 62 251246 | 11/1987 |
|----|-----------|---------|
| JP | 9 286258 | 11/1997 |
| JP | 10 341503 | 12/1998 |
| JP | 2000 289496 | 10/2000 |
| JP | 2001-342866 | 12/2001 |

(Continued)

OTHER PUBLICATIONS

Tooru Urasawa, et al., "Improving the Acceleration Feel of CVT", Nissan Technical Review, No. 53, pp. 97-102, 2003.

*Primary Examiner*—Khoi Tran
*Assistant Examiner*—Stephen Holwerda
(74) *Attorney, Agent, or Firm*—Oblon, Spivak, McClelland, Maier & Neustadt, L.L.P.

(57) ABSTRACT

A controlling system of a vehicle with a continuously variable transmission, which can render a sufficient accelerating feeling in responsive to a driver's requirement. A controller, upon judgment of an acceleration requirement, sets a target drive force higher than the target drive force upon normal calculation upon normal operation of an accelerator pedal, and sets a target rotation speed upon acceleration higher than the target rotation speed upon the normal operation and increasing with an increase of the vehicle speed by a predetermined gradient. The speed change ratio of the continuously variable transmission and the output torque of the engine are controlled such that the set target drive force is achieved, and an input shaft rotation speed of the continuously variable transmission coincides with the target rotation speed upon the set acceleration. Thus upon acceleration, the target drive force and the output rotation speed of the drive source increase.

18 Claims, 22 Drawing Sheets

U.S. PATENT DOCUMENTS

| | | | |
|---|---|---|---|
| 4,964,051 A * | 10/1990 | Sekozawa et al. | 701/102 |
| 5,586,953 A * | 12/1996 | Abo | 477/47 |
| 5,928,301 A | 7/1999 | Soga et al. | |
| 6,006,070 A | 12/1999 | Wong | |
| 6,138,070 A * | 10/2000 | Shimanaka et al. | 701/51 |
| 6,389,347 B1 | 5/2002 | Nozaki | |
| 6,393,349 B1 | 5/2002 | Yasuoka | |
| 6,397,140 B2 * | 5/2002 | Minowa et al. | 701/96 |
| 2002/0010538 A1 * | 1/2002 | Uchida | 701/101 |
| 2003/0022753 A1 | 1/2003 | Mizuno et al. | |

FOREIGN PATENT DOCUMENTS

| | | |
|---|---|---|
| JP | 2001-354051 | 12/2001 |
| JP | 2001 355477 | 12/2001 |
| JP | 2001 355718 | 12/2001 |
| JP | 2003 39989 | 2/2003 |
| JP | 2003 39990 | 2/2003 |
| JP | 2003 254421 | 9/2003 |
| JP | 2004-116637 | 4/2004 |

* cited by examiner

CONTROLLING SYSTEM FOR VEHICLE WITH CONTINUOUSLY VARIABLE TRANSMISSION

CROSS REFERENCE

This application is a continuation of and is based upon and claims the benefit of priority under 35 U.S.C. §120 for U.S. Ser. No. 11/659,804, filed Feb. 9, 2007, which is a National Stage of a PCT/JP05/14790, filed Aug. 5, 2005, and claims the benefit of priority under 35 U.S.C. §119 from Japanese Patent Application No. 2004-232784, filed Aug. 9, 2004, the entire contents of each which are incorporated herein by reference.

TECHNICAL FIELD

The present invention relates to a controlling system for vehicle provided with a continuously variable transmission, and in particular it relates to a technique for optimizing an accelerating feeling of the vehicle relative to an acceleration requirement by a driver.

BACKGROUND ART

There has been known a continuously variable transmission for vehicle, which transmits a power via a power transmitting member pressed by a hydraulic actuator to perform a continuous speed change by controlling supply/discharge of an operation oil to/from the hydraulic actuator. A belt-type continuously variable transmission including a pair of variable pulleys, a transmission member, and a pair of hydraulic cylinders can be illustrated as one example of such the continuously variable transmission. In detail, each of an input side variable pulley and an outputs side variable pulley has a construction such that an effective radius thereof can be varied, the transmission member wound around the input side variable pulley and the outputs side variable pulley transmits the power, and each of an input side hydraulic cylinder and an output side hydraulic cylinder varies width of a V-shaped grooves of the input side variable pulley and the outputs side variable pulley.

By the way, in the vehicle provided with the above continuously variable transmission, there has been proposed a controlling system, in which a target drive force is calculated from an output requirement amount and a vehicle speed, a target output of a drive source for achieving the target drive force is calculated, and a target output rotation speed preset for the target output is calculated. Then, a speed change ratio of the continuously variable transmission is controlled such that an actual output speed of the power source coincides with the target output rotation speed. Simultaneous with above speed change ratio control, after a target output torque of the power source is calculated based on the above target output and the actual output rotation speed of the power source, the power source is controlled to output this target output torque. For example, a patent document 1 has disclosed such the controlling system for vehicle provided with the continuously variable transmission.

[Patent Document 1] Japanese Patent Application Laid-open No. 2000-289496

By the way, the above controlling system of vehicle provided with the conventional continuously variable transmission controls the output torque of the power source and the speed change ration of the continuously variable transmission such that the power source operates in a driving condition along an optimal mileage curve. Such controls of the output torque of the power source and the speed change ration of the continuously variable transmission making a point of the mileage may suppress the target drive force and the output rotation speed of the drive source against an acceleration requirement by a driver. Thus, there has been a problem that sufficient accelerating feeling responsive to the driver's acceleration requirement can not be obtained from the vehicle.

The present invention is made in view of the above circumstances and has an object to provide a controlling system for vehicle provided with a continuously variable transmission in which a sufficient accelerating feeling can be rendered from the vehicle in response to the driver's acceleration requirement.

DISCLOSURE OF THE INVENTION

For achieving the above object in one aspect, the invention includes a controlling system for vehicle provided with a continuously variable transmission, which calculates a target rotation speed relative to an input shaft rotation speed of the continuously variable transmission and calculates a target output torque of a power source to achieve a target drive force calculated based on an output requirement amount and a vehicle speed, for controlling a speed change ratio of the continuously variable transmission based on the target rotation speed.

The controlling system further comprises (a) an acceleration requirement judging means of judging an acceleration requirement by a driver; and (b) a controlling means, upon judgment of the acceleration requirement by the acceleration requirement judging means, of setting a target drive force higher than the target drive force calculated, and setting a target rotation speed for acceleration higher than the target rotation speed calculated and increasing with an increase of the vehicle speed by a predetermined gradient, to thereby control the speed change ratio of the continuously variable transmission and the output torque of the power source such that the target drive force set is achieved and the input shaft rotation speed of the continuously variable transmission coincides with the target rotation speed for acceleration set.

According to the above aspect of the invention, the controlling system calculates the target rotation speed of the input shaft rotation speed of the continuously variable transmission and calculates the target output torque of a power source to achieve the target drive force calculated based on an output requirement amount and a vehicle speed, to thereby control the speed change ratio of the continuously variable transmission based on the target rotation speed.

Upon judgment of the acceleration requirement by the acceleration requirement judging means, the controlling means sets the target drive force higher than the target drive force calculated, and sets the target rotation speed for acceleration higher than the target rotation speed calculated and increasing with the increase of the vehicle speed by the predetermined gradient, to thereby control the speed change ratio of the continuously variable transmission and the output torque of the power source such that the target drive force set is achieved and the input shaft rotation speed of the continuously variable transmission coincides with the target rotation speed for acceleration set.

In this way, upon the acceleration requirement by the driver, as a result of the increased target drive force and the increased output rotation speed of the drive source, the accelerating feeling sufficiently high relative to the required output amount can be obtained from the vehicle. In particular, owing to the close relevancy (linearity) between the vehicle acceleration and the change of output rotation speed, a favorable accelerating feeling can be obtained.

In another aspect of the invention the controlling means, upon judgment of the acceleration requirement by the acceleration requirement judging means, sets the target rotation speed for acceleration such that the input shaft rotation speed of the continuously variable transmission increases as the output requirement amount becomes larger.

According to the above aspect, upon judgment of the acceleration requirement by the above acceleration requirement judging means, the controlling means sets the target rotation speed for acceleration such that the input shaft rotation speed of the continuously variable transmission increases as the output requirement amount becomes larger. Consequently, a sufficient accelerating feeling relative to the driver's requirement can be obtained.

In another aspect of the invention the controlling means, just after judgment of the acceleration requirement by the acceleration requirement judging means, sets the shaft target rotation speed for acceleration such that the input shaft rotation speed of the continuously variable transmission increases by a change rate in response to a changing degree of the output requirement amount.

According to the above aspect of the invention, the controlling means, just after judgment of the acceleration requirement by the acceleration requirement judging means, sets the shaft target rotation speed for acceleration such that the input shaft rotation speed of the continuously variable transmission increases by the change rate in response to a changing degree of the output requirement amount. Consequently, the accelerating feeling responsive to the various accelerating requirement by the driver can be obtained.

In another aspect of the invention the controlling means, upon judgment of the acceleration requirement by the acceleration requirement judging means, (i) calculates a basic target rotation speed for acceleration based on the output requirement amount, and calculates a transition target rotation speed for acceleration gradually increasing from the target rotation speed calculated in accordance with a change rate based on the changing degree of the output requirement amount, (ii) sets the transition target rotation speed as the target rotation speed for acceleration until the transition target rotation speed reaches the basic target rotation speed, and (iii) sets the basic target rotation speed as the target rotation speed for acceleration after the transition target rotation speed reaches the basic target rotation speed.

According to the above aspect of the invention, the controlling means, upon judgment of the acceleration requirement by the acceleration requirement judging means, calculates the basic target rotation speed for acceleration based on the output requirement amount, and the transition target rotation speed for acceleration gradually increasing from the target rotation speed calculated in accordance with the change rate based on the changing degree of the output requirement amount. It sets the transition target rotation speed as the target rotation speed for acceleration until the transition target rotation speed reaches the basic target rotation speed, and sets the basic target rotation speed as the target rotation speed for acceleration after the transition target rotation speed reaches the basic target rotation speed. Consequently, the accelerating feeling responsive to both the output requirement amount and various accelerating requirement by the driver can be obtained.

In another aspect of the invention the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value.

According to the above aspect of the invention, the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value. Consequently, the responsibility of the drive force relative to the requirement output can be increased for obtaining the favorable accelerating feeling.

In another aspect of the invention the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value.

In another aspect of the invention the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value.

In another aspect of the invention the controlling means, just after judgment of the acceleration requirement by the acceleration requirement judging means, sets the target rotation speed for acceleration such that the input shaft rotation speed of the continuously variable transmission increases by a change rate in response to a changing degree of the output requirement amount.

In another aspect of the invention the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value.

In another aspect of the invention the controlling means feedback-controls the input shaft rotation speed to coincide with the target rotation speed. Upon judgment of the acceleration requirement by the acceleration requirement judging means, it increases a gain of the feedback control such that a deviation between the target rotation speed for acceleration and the input shaft rotation speed falls within a predetermined value.

In another aspect of the invention, (a) the controlling system further comprising a re-acceleration judgment means of judging a re-acceleration requirement by the driver during the acceleration requirement. (b) The controlling means, upon judgment of the re-acceleration requirement by the re-acceleration requirement judging means, further increases the target drive force set and further increases the target rotation speed for acceleration set regardless of increase of the vehicle speed.

According to the above aspect of the invention, the controlling system further comprises the re-acceleration judgment means of judging a re-acceleration requirement by the driver during the acceleration requirement, and the controlling means, upon judgment of the re-acceleration requirement by the re-acceleration requirement judging means, further increases the target drive force set and further increases the target rotation speed for acceleration set regardless of increase of the vehicle speed. Consequently, the accelerating feeling upon performance of the re-acceleration can be further increased.

In another aspect of the invention, (a) the controlling system further comprises a slowdown judgment means of judging a slowdown requirement by the driver during the acceleration requirement, and (b) the controlling means, upon judgment of the slowdown requirement by the slowdown requirement judging means with a state the target drive force being increased due to the judgment of the acceleration requirement and the target rotation speed for acceleration being set, gradually decreases the target drive force and gradually decreases the target rotation speed for acceleration.

According to the above aspect of the invention, the controlling system further comprises a slowdown judgment means of judging a slowdown requirement by the driver during the acceleration requirement. The controlling means, upon judgment of the slowdown requirement by the slowdown requirement judging means with a state the target drive force being increased due to the judgment of the acceleration requirement and the target rotation speed for acceleration being set, gradually decreases the target drive force and gradually decreases the target rotation speed for acceleration. Consequently, even upon the slowdown requirement during the acceleration requirement, both the drive force variation and the rotation speed variation can be made smooth for performing the smoother slowdown.

In another aspect of the invention the controlling means, upon judgment of the slowdown requirement by the slowdown requirement judging means with a state the target drive force being increased due to the judgment of acceleration requirement and the target rotation speed being set, gradually decreases the target drive force for acceleration toward the target drive force for acceleration set upon judgment of the acceleration requirement in a predetermined mode.

According to the above aspect of the invention, the controlling means, upon judgment of the slowdown requirement by the slowdown requirement judging means with a state the target drive force being increased due to the judgment of acceleration requirement and the target rotation speed being set, gradually decreases the target drive force for acceleration toward the target drive force for acceleration set upon judgment of the acceleration requirement in the predetermined mode. Consequently, the accelerating responsibility of the vehicle upon the re-acceleration requirement after the slowdown requirement can be increased.

In another aspect of the invention, (a) the controlling system further comprises a road surface judging means of judging a running road surface is of low friction coefficient or not, and (b) the controlling means, on a condition of the road surface judging means not judging the running road surface of the low friction coefficient upon the judgment of acceleration requirement, controls the speed change ratio of the continuously variable transmission and the output torque of the power source such that the target drive force set is achieved and the input shaft rotation speed of the continuously variable transmission coincides with the target rotation speed for acceleration set.

According to the above aspect of the invention, the controlling system further comprises the road surface judging means of judging the running road surface is of low friction coefficient or not. The controlling means, on a condition of the road surface judging means not judging the running road surface of the low friction coefficient, upon the judgment of acceleration requirement, controls the speed change ratio of the continuously variable transmission and the output torque of the power source such that the target drive force calculated is achieved and the input shaft rotation speed of the continuously variable transmission coincides with the target rotation speed for acceleration set. Consequently, a deteriorated running property on the running road surface of the low friction coefficient can be prevented.

Here, the above "output requirement amount" means a parameter representing an output amount required for the vehicle by the driver, and an accelerator open-degree representing an operated amount of the accelerator pedal, a throttle open-degree representing an open-degree of a throttle valve, a fuel injection amount representing an injection amount of fuel injected into a chamber provided in the engine air-intake tube or into a cylinder, and an absorption air amount absorbed through an engine absorption tube can be used for the output requirement amount.

Also, the above continuously variable transmission is the speed change machine which can change the speed change ratio continuously i.e., steplessly. It includes a belt-type continuously variable transmission having a pair of variable pulleys of which groove width i.e., an effective radius is variable, and a transmission belt wound around the variable pulleys, in which the effective radii of the paired variable pulleys are varied reversely to vary the speed change ratio continuously. In addition thereto, a troidal-type continuously variable transmission is included, which comprises a pair of cone members disposed coaxially to be rotatably, and plural rollers disposed therebetween in a nip state. Here, the roller axes are rotated within a surface including a rotation axis of the paired cone members to vary the speed change ratio continuously.

DETAILED DESCRIPTION OF THE PREFERRED EMBODIMENT

In the following, embodiment of the present invention will be explained with reference to attached drawings.

Figure 1:
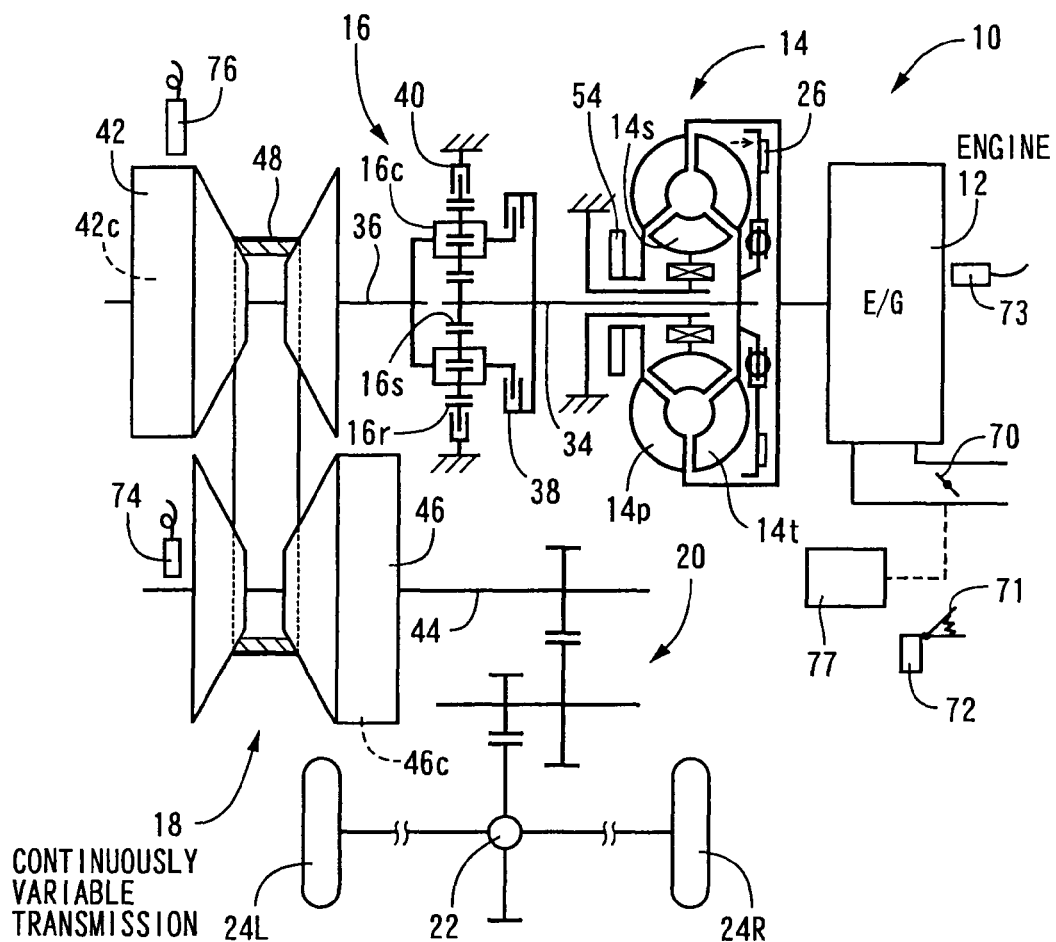
FIG. 1 is a framework view of a power transmitting apparatus for vehicle to which one embodiment of a controlling system for vehicle of the present invention is applied.

FIG. 1 shows a schematic view showing a power transmitting system 10 provided in a vehicle and including a belt-type continuously transmitting machine 18 to which a controlling apparatus of an embodiment of the present invention is applied. The power transmitting system 10 is suitably used for a laterally disposed FF type vehicle (front-engine front-drive vehicle) and includes a drive power source in the form of an engine 12 which is an internal combustion engine to be used as a power source of a vehicle running. An output of the engine 12 is transmitted through a torque converter 14, a forward/reverse switching device 16, a belt-type continuously variable transmission (CVT) 18, and a speed reducing gear device 20 to a differential gear device 22, and is distributed to right and left drive wheels 24R and 24L. The belt-type continuously variable transmission 18 is disposed in a power transmitting route extending from the engine 12 to the right and left driving wheels 24L and 24R.

The torque converter 14 includes a pump impeller $14p$ connected to a crankshaft of the engine 12, a turbine impeller $14t$ connected to the forward/reverse switching device 16 through a turbine shaft 34, and a fix impeller $14s$ rotatably supported by a non-rotatable member through a one-way clutch. It transmits the power through the fluid. Between the pump impeller $14p$ and turbine impeller $14t$, a lock-up clutch (directly-connected clutch) 26 is disposed to connect the impellers $14p$ and $14t$ integrally for allowing an integral rotation thereof. The forward/reverse switching device 16 is constituted by a planetary gear set of a double-pinion type. This planetary gear set includes a sun gear $16s$ to which the turbine shaft 34 of the torque converter 14 is connected, and a carrier $16c$ to which the input shaft 36 of the belt-type continuously variable transmission 18 is connected. By engagement of a forward-drive clutch 38 interposed between the carrier $16c$ and the ring gear $16r$, the forward/reverse switching device 16 integrally rotates to therewith directly connect the turbine shaft 34 to the input shaft 36, so that the driving force in the forward direction is transmitted to the driving wheels 24L, 24R. By engagement of a reverse-drive brake 40 interposed between the ring gear $16r$ and the housing and release of the forward-drive clutch 38, the input shaft 36 rotates in a direction opposite to the turbine shaft 34, so that a drive force in the reverse direction is transmitted to the drive wheels 24R, 24L.

The belt-type continuously variable transmission 18 includes an input side variable pulley 42, an output side variable pulley 46 and a transmitting belt 48. The input side variable pulley 42 is connected to the input shaft 36 and is variable in an effective radius thereof, while the output side variable pulley 46 is connected to the output shaft 44 and is variable in an effective radius thereof. The transmitting belt 48 is wound around each of V-shaped grooves of the variable pulleys 42 and 46. Utilizing a frictional force generated between the transmitting belt 48 functioning as the power transmitting member and each of inner wall surfaces of the variable pulleys 42 and 46, the power is transmitted. An input side hydraulic oil cylinder $42c$ and an output side hydraulic oil cylinder $46c$ are respectively provided for the input side variable pulley 42 and the output side variable pulley 44 to alter a width of each of the V-shaped grooves, i.e., an engaging radius of the transmitting belt 48 therewith.

A flow amount of an operation oil to be supplied to the hydraulic cylinder 42c of the input side variable pulley 42 and that to be discharged therefrom are controlled by a speed change control valve device (refer to FIG. 3) in a hydraulic control circuit 52 to vary the widths of the V-shaped groove width of the variable pulleys 42 and 46. Variation of the V-shaped groove widths alters the engaging radius (effective radius) of the transmitting belt 48 with the variable pulleys 42 and 46, whereby speed-change ratio γ(=input side rotation speed $N_{IN}$/output side rotation speed $N_{OUT}$) is continuously varied.

A hydraulic pressure $P_B$ in the hydraulic cylinder 46c of the output side variable pulley 46 corresponds respectively to a nipping force of the variable pulley 46 to the transmitting belt 48 and a tension force for the transmitting belt 48, and closely relates to the tension force of the transmitting belt 48 i.e., a pressing force of the transmitting belt 48 to the inner wall surface of the V-shaped groove of each of the variable pulleys 42 and 46. For this reason, it may be called as a belt tension force control pressure, a belt nip force control force, or a belt press force control pressure. For preventing slippage of the transmitting belt 38 relative to the variable pulleys 42 and 46, the hydraulic pressure $P_B$ is pressure-regulated by a nip force control valve 60 provided in the hydraulic controlling circuit 52 such that the transmitting belt 48 does not slip.

Figure 2:
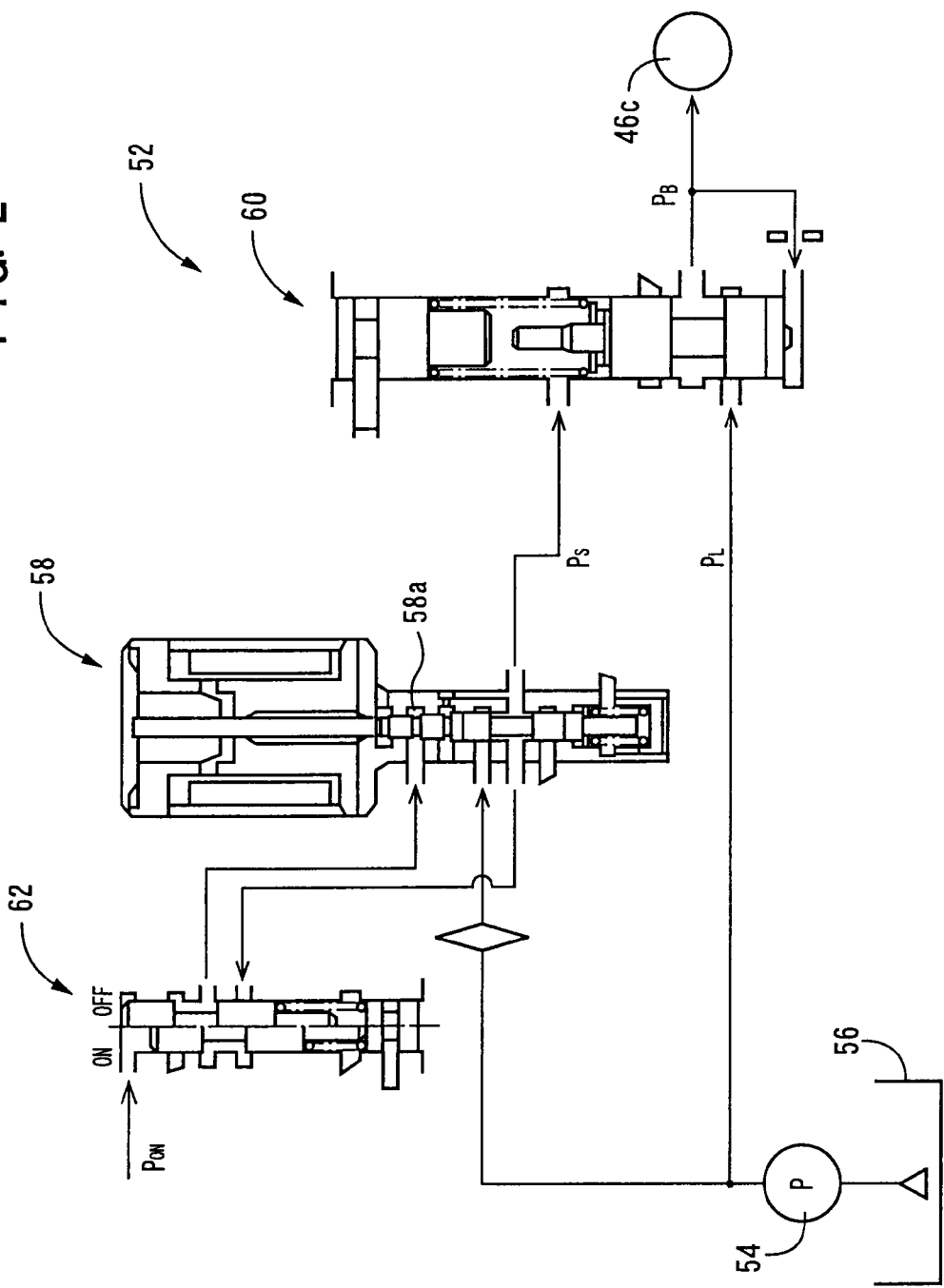
FIG. 2 is a view of a main portion of a hydraulic control circuit for controlling a belt-type continuously variable transmission in the power transmitting apparatus shown in FIG. 1, showing a portion relating to a belt tension control.
Figure 3:
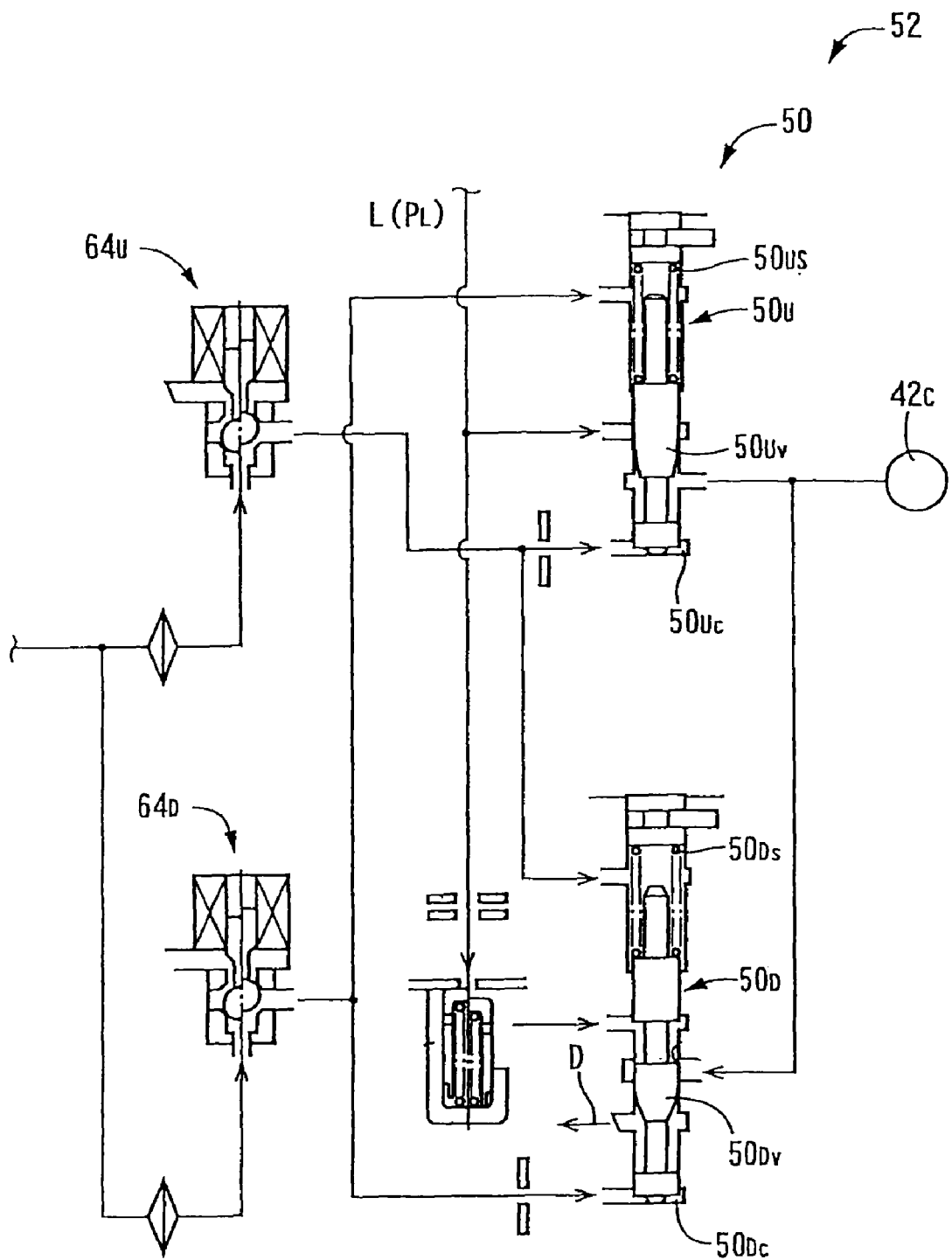
FIG. 3 is a view of a main portion of a hydraulic control circuit for controlling a belt-type continuously variable transmission in the power transmitting apparatus shown in FIG. 1, showing a portion relating to a speed change ratio control.

FIG. 2 and FIG. 3 are views showing one example of the above hydraulic control circuit 52, in which FIG. 2 show a circuit relating to a pressure regulation operation for the belt tension force controlling pressure of FIG. 2, and FIG. 3 shows a circuit relating to the speed change ratio control. In FIG. 2, an operation oil returned to an oil tank 56 supplied under pressure to a gear-type hydraulic pump 54 directly connected to the engine to be driven, is pressure-regulated by a line pressure regulating valve (not shown) to a line pressure $P_L$, and supplied to both a linear solenoid valve 58 and a nip force control valve 60 as a base pressure.

Based on a continuously variable exciting current supplied from an electronic control device 66 (refer to FIG. 4) to the linear solenoid valve 58 continuously controlled, the linear solenoid valve 58, based on the pressure of the operation oil supplied from the hydraulic pump 54, generates a control pressure $P_S$ of a magnitude corresponding to the exciting current. This control pressure $P_S$ is supplied to the nip force control valve 60. The nip force controlling valve 60 generates a hydraulic pressure $P_B$ increasing as increase of the control pressure $P_S$ and supplies it to the hydraulic cylinder 46c of the output side variable pulley 46, so that the nip force to the transmitting belt 48 i.e., the tension force of the transmitting belt 48 is set as small as possible within a range not generating slippage of the transmitting belt 48. The increasing hydraulic pressure $P_B$ increases the belt nip force i.e., the frictional force between the variable pulleys 42 and 46 and the transmitting belt 48.

The linear solenoid valve 58 is provided with an oil chamber 58a to which the control pressure $P_S$ outputted from a cut back valve 62 in an on-state is supplied. In an off-state of the cut back valve 62, the supply of the control pressure $P_S$ to the oil chamber 58a is interrupted to open the oil chamber 58a to the atmosphere. Thus, characteristic of the control pressure $P_S$ is switched to lower side in the on state of the cut back valve 62, than in the off state thereof. The cut back valve 62 is switched to on state by being supplied a signal pressure $P_{ON}$ from a solenoid valve (not shown) in an on (engage) state of the lock up clutch 26 of the torque converter 14.

In FIG. 3, the speed change control valve device 50 is constructed by an up speed change control valve $50_U$ and a down speed change control valve $50_D$. The up speed change control valve $50_U$ supplies the operation oil of the line pressure $P_L$ mainly to the hydraulic cylinder 42c of the input side variable pulley 42 and controls the amount of the operation oil to control the speed change speed in the up direction. The down speed change control valve $50_D$ controls the amount of the operation oil discharged from the hydraulic cylinder 42c to control the speed change speed in the down direction.

The up speed change control valve $50_U$ includes a spool body $50_{UV}$, a spring $50_{US}$, and a control oil chamber $50_{UC}$. The spool body $50_{UV}$ opens/closes a communication between a line oil path L introducing the line pressure $P_L$ and the input side hydraulic cylinder 42c. The spring $50_{US}$ biases the spool body $50_{UV}$ to a valve closing direction, and the control oil chamber $50_{UC}$ introduces the control pressure outputted from an up side solenoid valve $64_U$. The down speed change valve $50_D$ includes a spool body $50_{DV}$, a spring $50_{DS}$, and a control oil chamber $50_{DC}$. The spool body $50_{DV}$ opens/closes a communication between a drain oil path D and the input side hydraulic cylinder 42c. The spring $50_{DS}$ biases the spool body $50_{DV}$ to a valve closing direction, and the control oil chamber $50_{DC}$ introduces the control pressure outputted from a down side solenoid valve $64_D$.

The up side solenoid valve $64_U$ and the down side solenoid valve $64_D$ are duty-controlled by the electronic control device 66 to supply the continuously variable control pressure to the control oil chamber $50_{UC}$ and the control oil chamber $50_{DC}$, whereby the speed-change ratio γ of the belt-type continuously variable transmission 18 is continuously varied to the up side and the down side.

Figure 4:
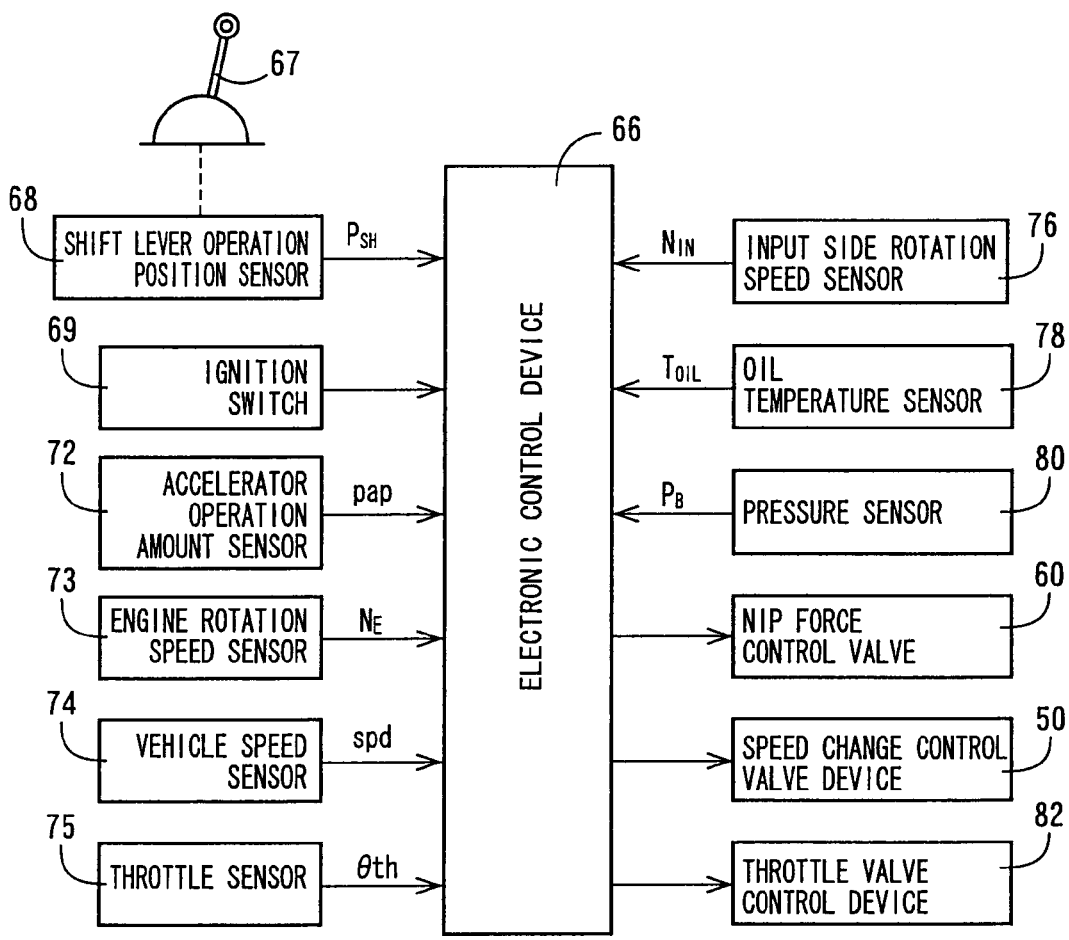
FIG. 4 is a view briefly explaining an electrical structure of a controlling system of the embodiment shown in FIG. 1.

FIG. 4 shows the electronic control device 66 provided in the vehicle of this embodiment. To this electronic control device 66, a signal representing an operation position $P_{SH}$ from an operation position detection sensor 68 detecting an operation position of a shift lever 67, a signal representing an on-operation of an ignition key from an ignition switch 69 operated by the ignition key, a signal representing a throttle open-degree θth from a throttle sensor 75 detecting throttle open-degree θth of a throttle valve 70 driven by a throttle actuator 77, and a signal representing an output requirement amount by a driver i.e., a signal representing an acceleration open-degree pap from an acceleration operation amount sensor 72 detecting an open-degree pap of an acceleration pedal 71 are inputted.

Also, a signal representing a rotation speed $N_E$ from an engine rotation speed sensor 73 detecting a rotation speed $N_E$ on an engine 12, a signal representing a vehicle speed spd from a vehicle speed sensor (output side rotation speed sensor) 74 detecting a vehicle speed (concretely, a rotation speed $N_{OUT}$ of an output shaft 44), a signal representing an input shaft rotation speed $N_{IN}$ from an input side rotation speed sensor 76 detecting an input shaft rotation speed $N_{IN}$ of an input shaft 36, a signal representing an operation oil temperature $T_{OIL}$ from an oil temperature sensor 78 detecting an operation oil temperature $T_{OIL}$ in the belt-type continuously variable transmission 18 i.e., the power transmitting system 10, and a signal representing an oil temperature $P_B$ from a pressure sensor 80 detecting an actual belt nip force control pressure $P_B$ i.e., an internal pressure $P_B$ of a hydraulic cylinder 46c of an output side variable pulley 46 are inputted to the electronic control device. 66.

The electronic control device 66 is constructed by a so-called microcomputer including a CPU, a ROM, a RAM, an input/output interface and the like. It processes signals utilizing a temporary memory function of a RAM according to a program memorized in a ROM in advance to perform an output torque control of a vehicle engine 12, a speed change control of the belt-type continuously variable transmission 18, and a nip force control for the transmitting belt 48. The output torque control of the vehicle engine 12 is performed to obtain a suitable accelerating feeling and suitable mileage, and the nip force control is performed to set a necessary and sufficient tension force of the transmitting belt 48.

In the above output torque control, a target output torque TE is determined based on a relation memorized in advance, and the open-degreeθth of the throttle valve 70 is adjusted by the throttle valve control device 82 to realize such the target output torque TE. Thus, the output torque from the engine is controlled. In the above speed change control, a target rotation speed NINT is determined based on a relation memorized in advance, and the speed change control valve device 50 is operated such that the target rotation speed NINT coincides with an actual inputs side rotation speed $N_{IN}$, whereby flow amounts of the operation oil supplied to the hydraulic cylinder 42c of the input side variable pulley 42 and of the operation oil discharged from the hydraulic cylinder 42c are controlled. In this way, the speed change ratio γ of the belt-type continuously variable transmission 18 is adjusted.

Figure 5:
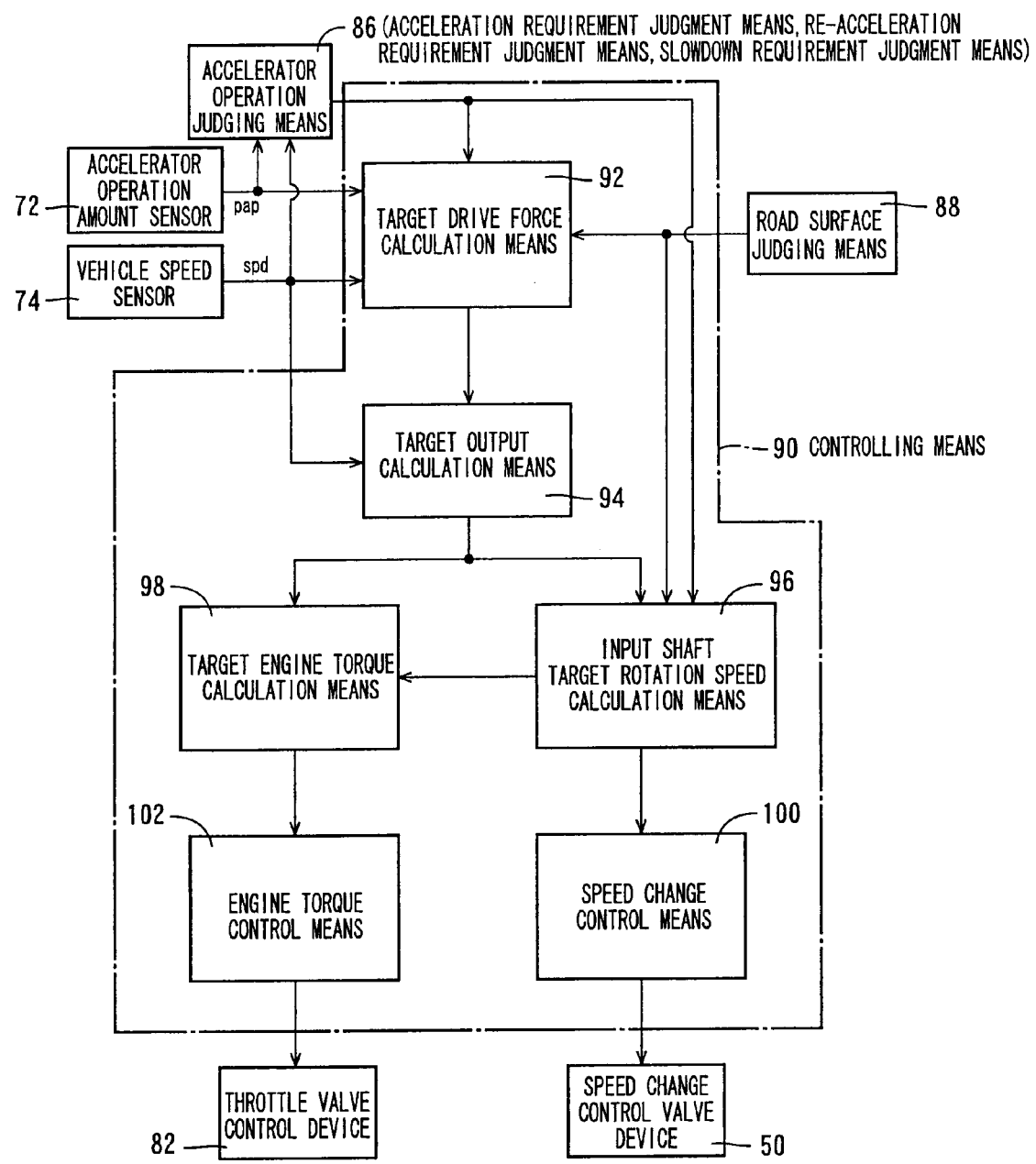
FIG. 5 is a function block diagram explaining a main portion of the control function of an electronic control device shown in FIG. 4.

In the belt nip force control for obtaining the required and sufficient hydraulic pressure (target pressure corresponding to an ideal belt nip force), by a relation (map) determined in advance, a belt nip force control pressure (target value) is calculated based on the actual input torque TN of the belt-type continuously variable transmission 18 or the accelerator open-degree pap corresponding to the transmitting torque and the actual speed change ratio γ. Then, the nip force control valve 60 in the hydraulic control circuit 52 is operated to realize such the belt nip force control pressure (target value). FIG. 5 is a function block diagram explaining a main control function i.e., the drive force and the speed change ratio of the above electronic control device 66. In FIG. 5, an accelerator operation judging means 86 judges whether an operation of the accelerator pedal 71 by the driver is a predetermined acceleration, a predetermined re-acceleration operation, and a predetermined slowdown i.e., deceleration operation, or not, based on at least one of a vehicle speed spd, an accelerator open-degree pap, and an accelerator speed (a change rate of the accelerator operation mount) dpap. Accordingly, the accelerator operation judging means 86 also functions as an acceleration requirement judging means, a re-acceleration requirement judging means, and a slowdown i.e., deceleration requirement judging means.

The accelerator operation judging means 86 judges performance of the accelerator requirement operation in cases of that the vehicle speed spd is larger than a judgment value A preset, the accelerator open-degree pap is larger than a judgment value B preset, and the accelerator speed dpap is larger than a judgment value C preset. It judges completion of the accelerator requirement operation in cases of that the vehicle speed spd is smaller than the value A preset, and the accelerator open-degree pap is smaller than a value (B-D) preset. The above judgment values A, B, and C as well as the predetermined value D are experimentally calculated in advance to judge performance of the positive acceleration operation compared with a normal or ordinary running on a flat road. Here, the above judgment value B is a function value which increases as increase of the vehicle speed spd and which is determined based on an actual vehicle speed spd from a map memorized in advance.

Also, the accelerator operation judging means 86, in absence of the above acceleration judgment, judges performance of the re-acceleration requirement operation, on the condition that the accelerator speed dpap is larger than a judgment value E preset and a time period longer than a predetermined value F passes after the above acceleration judgment. It judges no performance of the re-acceleration requirement operation, in absence of the above acceleration judgment, when the accelerator speed dpap is lower than the judgment value E preset and a time period longer than the predetermined value F does not pass after the above acceleration judgment. The above judgment value E is experimentally calculated in advance to judge performance of the positive acceleration operation compared with the normal or ordinary running on the flat road.

Further, the accelerator operation judging means 86 judges performance of the slowdown requirement operation when a state of the accelerator speed dpap (negative value) being lower than a judgment value G preset continues a time period longer than a predetermined time period H preset, or when the accelerator speed dpap is lower than a judgment value I (<G) preset. It judges completion of the slowdown requirement operation when a final target rotation speed NINLINE becomes larger than a transition target rotation speed NINT, or the accelerator open-degree pap is lower than a judgment value (B-D) preset. However, when the operation of the accelerator pedal 71 does not correspond to any of the above acceleration requirement operation, the re-acceleration requirement operation and the slowdown requirement operation, the accelerator operation judging means 86 judges the requirement of normal operation which does not perform the positive acceleration or the slowdown carried out in the ordinary running on the flat road.

A road surface judging means 88 judges whether a road surface on which the vehicle is running is a running road surface of a low frictional coefficient (low μ road) such as a frozen road, a snow pressed road and the like. It judges the low μ road based on an excess of rotation speed difference between the driving wheel and the driven wheel over a predetermined value in the power-on running, or an excess of a speed difference between the maximum wheel speed and the minimum wheel speed over a predetermined value in the braking.

The speed change ratio γ of the continuously variable transmission 18 and the output torque of the engine 12 are controlled by a controlling means 90 corresponding to the acceleration requirement, the re-acceleration requirement or the slowdown requirement. The controlling means 90 includes (a) a target drive force calculation means 92, (b) a target output calculation means 94, (c) an input shaft target rotation speed calculation means 96, (d) a target engine torque calculation means 98, (e) a speed change control means 100, and (f) an engine torque control means 102.

The target drive force calculation means 92 serially calculates a target drive force FORCE upon normal i.e., in a normal state, a target drive force FORCEACL upon acceleration i.e., in an accelerated state, and a target drive force FORCEDCL upon slowdown i.e., in a slowdown state, corresponding to the judged results by the above accelerator operation judging means 86 based on the actual vehicle speed spd and the accelerator open-degree pap from a relation memorized in advance. The target output calculation means 94 serially calculates a target output POWER by multiplying the above target drive force serially calculated with the target drive force calculation means 92 by the vehicle speed spd.

The input shaft target rotation speed calculation means 96 serially calculates a input shaft target rotation speeds NINLINE upon acceleration, upon re-acceleration i.e., in a re-accelerated state and upon slowdown, corresponding to the judged results by the above accelerator operation judging means 86 by the relation memorized in advance based on the actual vehicle speed spd, the accelerator open-degree pap and the accelerator speed dpap. The target engine torque calculation means 98 serially calculates a target engine torque TE by dividing the target output POWER serially calculated by the above target output calculation means 94 by the current engine rotation speed NE or by the input shaft target rotation speed NINLINE calculated with the above input shaft target rotation speed calculation means 96.

The speed change control means 100 serially adjusts the speed change ratio γ of the belt-type continuously variable transmission 18. For such the serial adjustment, the speed change control valve device 50 is operated such that the above input shaft target rotation speed NINLINE coincides with the actual input side rotation speed $N_{IN}$, whereby flow amounts of the operation oil supplied to the hydraulic cylinder 42c of the input side variable pulley 42 and the operation oil discharged therefrom are serially adjusted. The engine torque control means 102 serially controls the output torque outputted from the engine 12. For such the serial control, the open-degree θth of the throttle valve 70 is serially controlled with the throttle valve control device 82 such that the above target output TE is obtained.

The above speed change control means 100, according to a following PI feedback control equation (C1) for example, feedback-controls the input shaft rotation speed $N_{IN}$ based on a deviation e (=NINLINE$-N_{IN}$) to be coincided with the target rotation speed NINLINE. When the acceleration operation judging means 86 judges the acceleration requirement, the speed change control means 100 temporarily increases a gain G of the feedback control until the deviation e (=NINLINE$-N_{IN}$) between the target rotation speed NINLINE upon the acceleration and the input shaft rotation speed $N_{IN}$ falls within the predetermined range M. In the equation C(1), a left side $N_{IN}$ represents a present input shaft rotation speed (control amount), a first section $N_{IN0}$ of a right side represents an input shaft rotation speed (control amount) of a last control cycle, a second section $\Delta N_{IN}$ of the right side represents a changed part of the control amount, a $C_P$ represents a proportion factor (gain), and $C_i$ represents a constant of integration (gain).

$$N_{IN}=N_{IN0}+\Delta N_{IN} \qquad (C1)$$

Here, $\Delta N_{IN}$ can be represented by a following equation.

$$\Delta N_{IN}=C_P \times e + C_i \times \int e\, dt$$

In the following, each of the target value calculating functions for the above acceleration operation, the re-acceleration operation, and the slowdown operation of the accelerator pedal 71 will be explained in detail.

Figure 6:
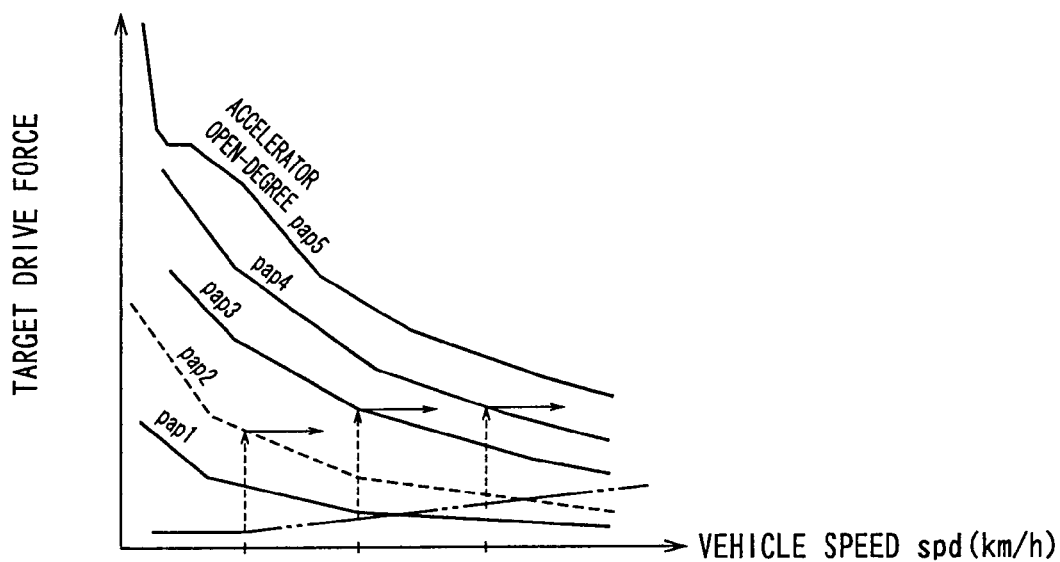
FIG. 6 is a view showing a relation memorized in advance to calculate a target drive force in a control which the electronic control device shown in FIG. 4 performs.

First, when the accelerator operation judging means 86 judges the normal operation of the accelerator pedal 71, the target drive force calculation means 92 determines the target drive force FORCE upon normal by the relation represented by the equation (1) and memorized in advance based on the actual vehicle speed spd and the accelerator open-degree pap. The relation represented by the above equation (1) well known is shown by the characteristic curves in FIG. 6. FIG. 6 shows a second dimension coordinate defined by a target drive force line and a vehicle speed line intersected perpendicularly. The target drive force line (vertical line) represents the target drive force FORCE, while the vehicle speed line (vertical line) represents the vehicle speed spd, and plural hyperbola-like characteristic curves are arranged side by side with the accelerator open-degree as the parameter. On one characteristic curve corresponding to the actual accelerator open-degree pap, a value on the target drive force line corresponding to the actual vehicle speed spd is determined as the actual target drive force FORCE.

A target output calculation means 94 calculates the target output POWER by the relation represented by an equation (2) and memorized in advance based on the above target drive force FORCE calculated by the above target drive force calculation means 92 and the actual vehicle speed spd. Next, the input shaft target rotation speed calculation means 96 calculates an input shaft target rotation speed NIN upon normal by a relation represented by an equation (3) memorized in advance based on the above target output POWER upon normal and the actual vehicle speed spd. The relation represented by the equation (3) well known by characteristic curves is shown in FIG. 7.

Figure 7:
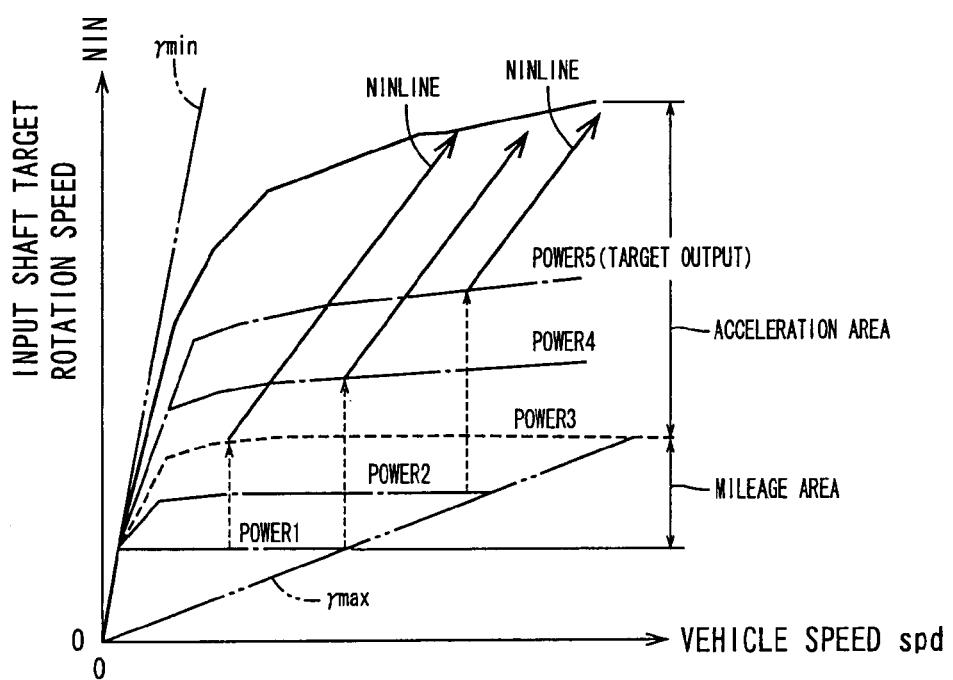
FIG. 7 is a view showing a relation memorized in advance to determine a target rotation speed in a control which the electronic control device shown in FIG. 5 performs.

FIG. 7 shows a second dimension coordinate defined by an input shaft target rotation speed line (vertical line) representing the input shaft target rotation speed NIN and a vehicle speed line (horizontal line) representing the vehicle speed spd intersected perpendicularly. In FIG. 7, in a fan-shaped area defined by a line representing the maximum speed change ratio $\gamma_{max}$ and a line representing the minimum vehicle speed ratio $\gamma_{min}$ of the belt-type continuously variable transmission 18, plural characteristic curves FORCE1 to FORCE5 are arranged side by side with the target drive force FORCE upon normal as the parameter. On one characteristic curve corresponding to the actual target drive force FORCE upon normal, considering a point corresponding to the actual vehicle speed spd, a value on the input shaft target rotation speed line corresponding to the above point is determined as the actual input shaft rotation speed NIN.

The above characteristic curves FORCE1 to FORCE5 are set such that the operation point of the engine 12 moves along an optimum mileage line with increase of the engine rotation speed $N_E$. Also, the target engine torque calculation means 98 calculates the target engine torque TE by a relation defined by a following equation (4) and memorized in advance based on the target output POWER upon normal calculated by the above target output calculation means 94 and the input shaft target rotation speed NIN upon normal calculated by the input shaft target rotation speed calculation means 96.

$$\text{FORCE}=\text{map}(pap, spd) \qquad (1)$$

$$\text{POWER} \propto \text{FORCE}/spd \qquad (2)$$

$$NIN=\text{map}(\text{POWER}, spd) \qquad (3)$$

$$TE \propto \text{POWER}/NIN \qquad (4)$$

Then, when the accelerator operation judging means 86 judges the acceleration requirement operation of the accelerator pedal 71, and the road surface judging means 88 judges the vehicle running road surface being not the running surface of low friction efficient (low μ road), a following control upon acceleration requirement will be carried out. On the contrary, when the road surface judging means 88 judges the vehicle running road surface being the running surface of low friction efficient (low μ road), the following control upon acceleration requirement is prohibited.

In the above control upon acceleration requirement, the target drive force calculation means 92 calculates a target drive force FORCEACL upon acceleration by a relation represented by an equation (5) and memorized in advance, based on an acceleration judgment initial drive force value FORCE0, an accelerator depression correction value FORCE (pap, spd) and a vehicle speed change correction value (vehicle speed integration section) FORCE (spd). Among them, the above acceleration judgment initial drive force FORCE0 is a value corresponding to the vehicle speed spd in the acceleration requirement judgment on a constant speed running line (long dashed double-short dashed line) in FIG. 6 balancing with a running resistance of the vehicle, and corresponds to the value just before the last acceleration judgment.

The accelerator depression correction value FORCE (pap, spd) is a value corresponding to both the accelerator open-degree (increased part) and the vehicle speed spd in the acceleration requirement judgment. This value corresponds to, in FIG. 6 and FIG. 8 enlarging FIG. 6, length of arrows extending vertically shown by dotted lines. As apparent from FIG. 6, the accelerator depression correction value FORCE (pap, spd) increases as the accelerator open-degree in the acceleration requirement judgment becomes larger, and decreases as the vehicle speed in the acceleration requirement judgment becomes higher.

The vehicle speed change correction value FORCE (spd) is a section for maintaining the accelerator depression correction value FORCE (pap, spd) at a constant value, or reducing it relative to an initial value, corresponding to the vehicle speed change from the acceleration requirement judgment timing. It is serially calculated in an accumulation (integration) manner, by an equation (6) memorized in advance based on an inclination coefficient α (spd0, pap) and a vehicle speed change part ($spd^1 - spd^{1-1}$). The above inclined coefficient α (spd0, pap) is a function of the vehicle speed spd0 and the accelerator open-degree pap just after performance of the acceleration requirement judgment, and it is determined to decrease as the vehicle speed spd0 becomes higher, and to decrease as the accelerator open-degree pap becomes larger, just after the acceleration requirement judgment.

Figure 8:
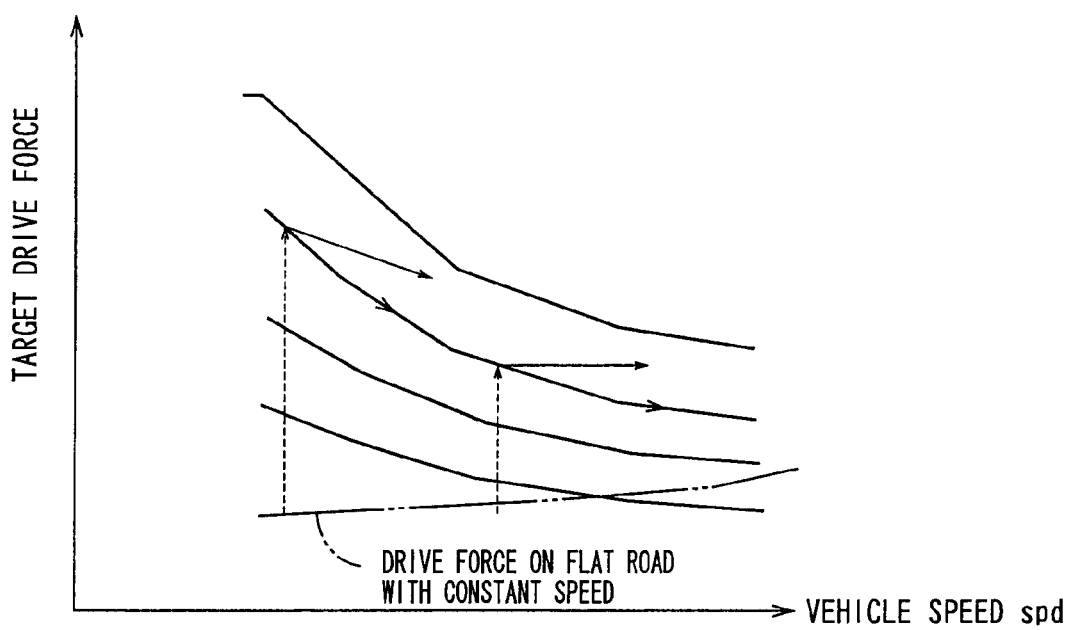
FIG. 8 is an enlarged view of FIG. 6 for explaining the target drive force calculated upon the acceleration.

As a result, as shown by solid line arrows in FIG. 6 and FIG. 8 enlarging FIG. 6, the target drive force FORCEACL upon the acceleration is maintained at a constant value relative to an initial value thereof, or is decreased by a predetermined rate relative to an initial value thereof. Next, the target output calculation means 94 calculates the target output POWER by a relation represented by an equation (7) which is similar to the equation (2) upon normal and which is memorized in advance, based on the target drive force FORCEACL upon the acceleration calculated by the above target drive force calculation means 92 and the actual vehicle speed spd.

After calculation of the target drive force FORCEACL upon the acceleration and the target output POWER upon performance of acceleration requirement judgment, an input shaft target rotation speed calculation means 96 calculates an input shaft target rotation speed NINLINE upon acceleration by a relation represented by an equation (8) and memorized in advance, based on the initial target rotation speed value NINLINE0 upon acceleration judgment, the accelerator depression correction value NIN (pap), the vehicle speed change correction value NIN (spd) and the accelerator speed correction value NIN (dspd, pap). The above initial target rotation speed value NINLINE0 upon acceleration judgment is a basic target rotation speed calculated by a relation represented by an equation (3) (refer to FIG. 7) and memorized in advance, based on the target output POWER and the actual vehicle speed just before performance of the acceleration requirement judgment. This value is the same as the value used in the normal state.

Figure 9:
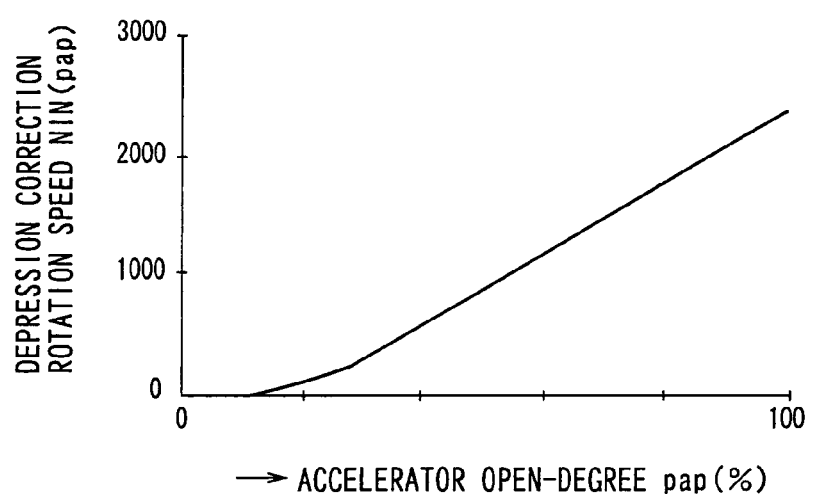
FIG. 9 is a view showing a relation memorized in advance to calculate a depression speed correction rotation speed NIN (pap) included in a calculation equation (8) of the target rotation speed in FIG. 7.

The above accelerator depression correction value NIN (pap) is a value corresponding to the accelerator depression amount (increased part) upon acceleration requirement judgment, and corresponds in FIG. 7 to length of arrow extending vertically shown by broken lines. The accelerator depression correction value NIN (pap) is a function which increases as the accelerator depression amount pap becomes larger, and is determined by a relation shown in FIG. 9 for example and is memorized in advance based on the actual accelerator open-degree pap.

The above vehicle speed change correction value NIN (spd) which is sometimes called a vehicle speed integration section, is the section for increasing the vehicle speed from an initial value (=initial target rotation speed value NINLINE0 upon acceleration judgment+accelerator depression correction value NIN (pap)) by a predetermined increase speed, corresponding to the vehicle speed change from the acceleration requirement judgment timing. It is serially accumulated (integrated) by an equation (9) memorized in advance, based on the inclined coefficient β (spd, pap), and a vehicle speed change part ($spd^1 - spd^{1-1}$) which is a difference between the vehicle speed $spd^1$ at the predetermined timing and the vehicle speed $spd^{1-1}$ at the timing earlier than it by one sampling cycle.

Figure 10:
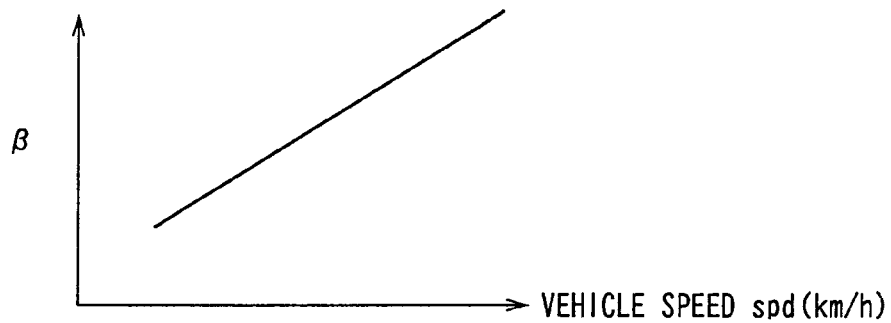
FIG. 10 is a view explaining a relation memorized in advance for calculating an inclination coefficient $\beta(spd, pap)$ which is included in a calculation equation (8) of the target rotation speed in FIG. 7 for calculating a vehicle speed change correction value NIN (spd) included.
Figure 11:
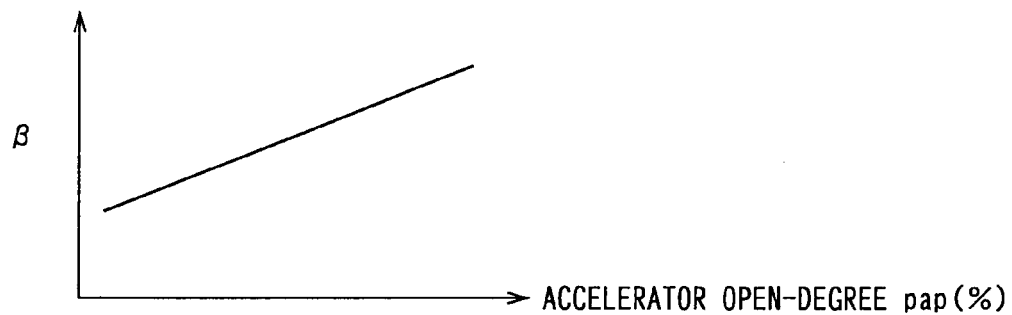
FIG. 11 is a view explaining a relation memorized in advance for calculating an inclination coefficient β(spd, pap) which is included in a calculation equation (8) of the target rotation speed in FIG. 7 for calculating a vehicle speed change correction value NIN (spd).

As shown in FIG. 10 and FIG. 11, the inclination coefficient β (spd, pap) is a function which increases as the vehicle speed spd becomes higher and the accelerator opened-degree pap becomes larger, and is determined by a relation shown in FIG. 10 and FIG. 11 and memorized in advance, based on the actual vehicle speed spd and the accelerator open-degree pap. The accelerator speed correction value NIN (dspd, pap) is a function which increases as the accelerator speed dspd becomes higher and increases as the accelerator open-degree pap becomes larger, and it is determined based on the actual accelerator speed dspd and the accelerator open-degree pap. Then, the target torque calculation means 98 calculates the target engine torque TE by a relation represented by an equation (10) which is the same as the equation (4) and is memorized in advance. The calculation is based on the target output POWER upon acceleration calculated by the above input shaft target rotation speed calculation means 94, and the input shaft target rotation speed NINLINE upon acceleration calculated by the above input shaft target rotation speed calculation means 96. Here, spd0 means the vehicle speed at the time when the acceleration judgment flag is switched from the off state to the on state.

$$FORCEACL = FORCE0 + FORCE(pap, spd) + FORCE(spd) \quad (5)$$

$$FORCE(spd) = [\alpha(spd0, pap) \times (spd^1 - spd^{1-1})] \quad (6)$$

$$POWER \propto FORCEACL/spd \quad (7)$$

$$NINLINE = NINLINE0 + NIN(pap) + NIN(spd) + NIN(dspd, pap) \quad (8)$$

$$NIN(spd) = [\beta(spd, pap) \times (spd^1 - spd^{1-1})] \quad (9)$$

$$TE \propto POWER/NINLINE \quad (10)$$

As a result, the above input shaft target rotation speed NINLINE increases, as shown in FIG. 7, from the initial value of the acceleration operation corresponding to an upper end of the arrow shown by the broken line, by the predetermined rate as shown by the solid line, as the vehicle speed spd increases. Incidentally, of the characteristic curves FORCE1 to FORCE5 in FIG. 7, the characteristic curve FORCE3 shown by the broken line represents a boundary between the mileage area and the acceleration area. For a case the operation of the accelerator pedal 71 being judged as the normal operation the mileage area is used, but for a case the operation of the accelerator pedal 71 being judged as the acceleration requirement judgment operation the acceleration area is used.

Figure 12:
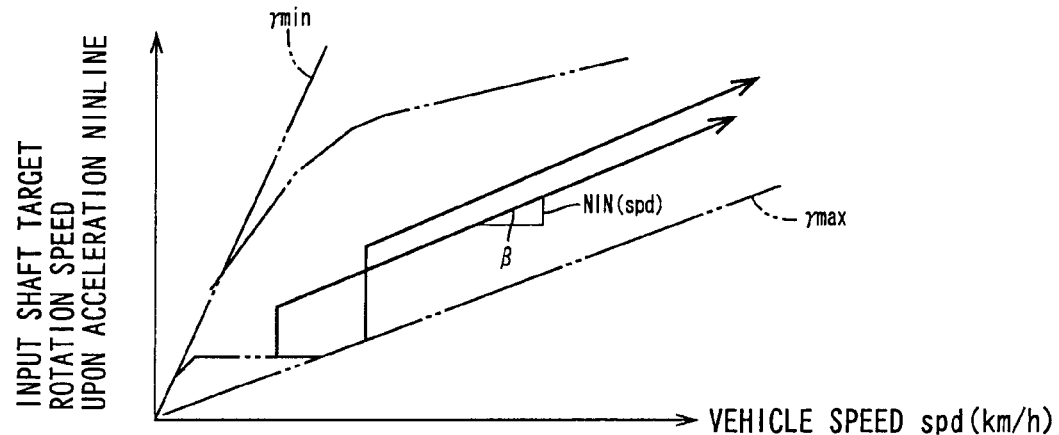
FIG. 12 a view explaining an inclination coefficient β(spd, pap) shown in FIG. 10 and FIG. 11.

FIG. 12 which is the view similar to FIG. 7, explains changes of the two kinds of the above target input rotation speed NINLINE upon acceleration of which the vehicle speed spd and the accelerator open-degree depression amount upon acceleration requirement judgment are different by solid lines. Bent points of the solid lines correspond to the initial value (=initial target rotation speed value NINLINE0 upon acceleration judgment+accelerator depression correction amount NIN (pap)), and the target input rotation speed NINLINE increases linearly from the initial point as the increase of the vehicle speed spd by substantially the constant rate. As a result, the vehicle is accelerated with the small change state of the speed change ratio γ of the belt-type continuously variable transmission 18, so that the engine rotation speed $N_E$ and the vehicle speed spd increase integrally for obtaining the suitable accelerating feeling.

Figure 13:
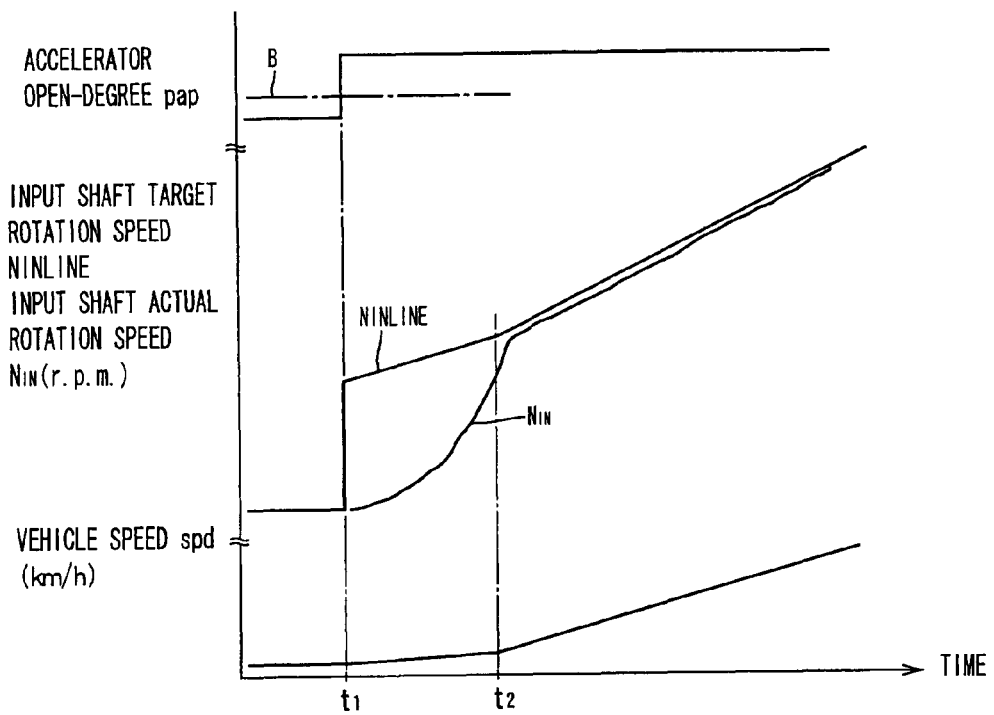
FIG. 13 is a timechart showing change of the target rotation speed NINLINE upon the acceleration requirement judgment calculated by an input shaft rotation speed calculation means shown in FIG. 5, showing an operation upon a sudden acceleration operation.
Figure 14:
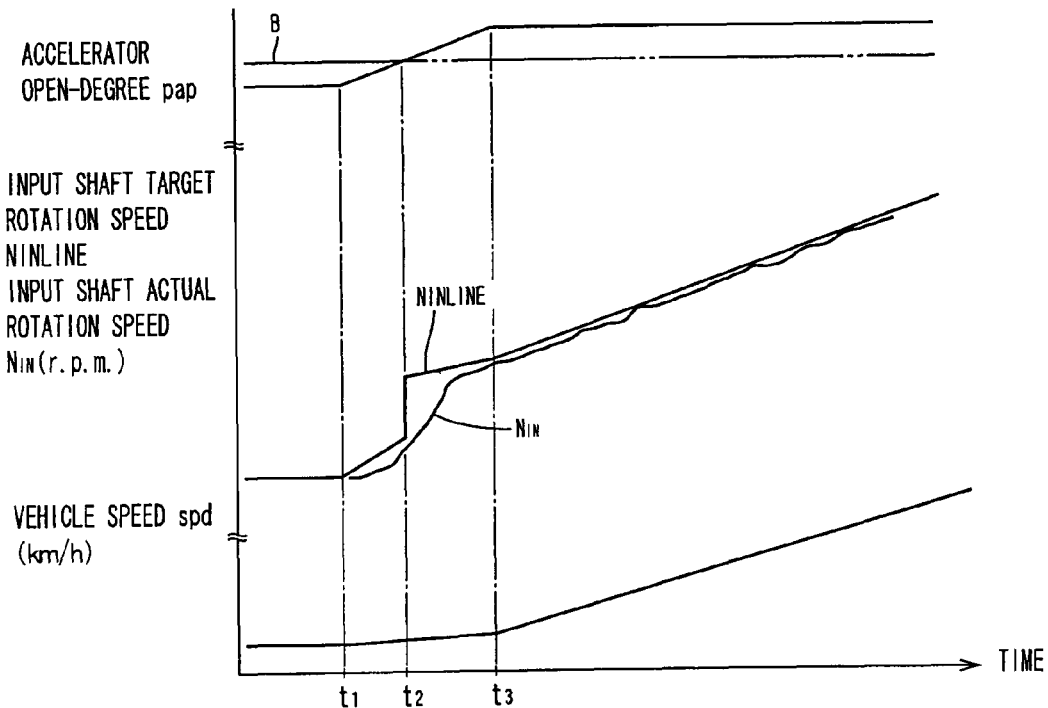
FIG. 14 is a timechart showing change of the target rotation speed NINLINE upon the acceleration requirement judgment calculated by an input shaft rotation speed calculation means shown in FIG. 5, showing an operation upon a gentle acceleration operation.

FIG. 13 and FIG. 14 are detail time charts representing the input shaft target rotation speed NINLINE upon acceleration serially determined by the control upon acceleration of the above input shaft target rotation speed calculation means 96. FIG. 13 shows a change upon a sudden depression of the acceleration pedal 71, while FIG. 14 shows a change upon a gentle depression thereof. In FIG. 13, $t_1$ represents a timing of a depression operation start of the accelerator pedal 71 and a timing of the acceleration requirement judgment, while $t_2$ represents a timing when the deviation e (NINLINE–$N_{IN}$) between the target rotation speed NINLINE upon the acceleration and the input shaft rotation speed NIN falls within the predetermined range M. On the contrary, in FIG. 14 $t_1$ represents a timing of the depression start of the accelerator pedal 71, $t_2$ represents a timing of the acceleration requirement judgment, and a timing $t_3$ represents a timing when the deviation e (NILINE–$N_{IN}$) between the target rotation speed NINLINE upon the acceleration and the input shaft rotation speed NIN falls within the predetermined range M. In FIG. 13 and FIG. 14, B represents an acceleration requirement judgment value.

In FIG. 13, a rise amount (width) of the target rotation speed NINLINE upon acceleration at the timing $t_1$ corresponds to the accelerator depression amount correction value NIN (pap) which is the function of the accelerator open-degree pap at that timing. The target rotation speed NINLINE upon acceleration increases thereafter with a rate having a predetermined relation to the vehicle speed rise, and the rotation change rate becomes constant under the constant acceleration. In FIG. 14, a rise amount (width) of the target rotation speed NINLINE upon acceleration at the timing $t_2$ when the acceleration requirement judgment is performed corresponds to the accelerator open-degree or the accelerator depression correction value NIN (pap) which are the function of the accelerator depression amount at the timing $t_1$. The target rotation speed for acceleration NINLINE thereafter increases with a rate having a predetermined relation to the vehicle speed rise, and the rotation change rate becomes constant under the constant acceleration. In this embodiment, the speed change system in the sudden acceleration operation and that of the gentle acceleration operation are unified to make the apparatus simple.

Figure 15:
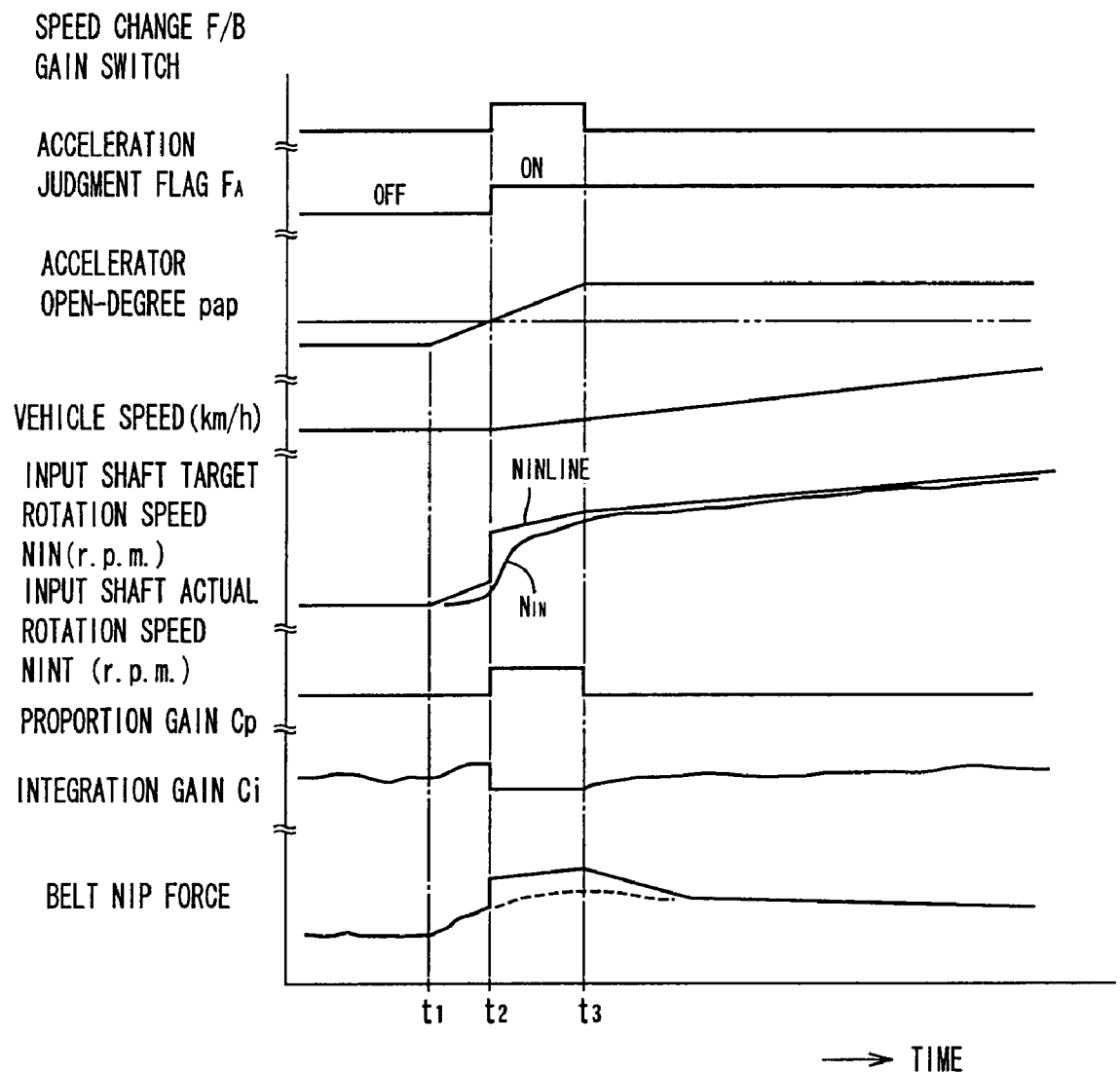
FIG. 15 is a timechart explaining a change of the target rotation speed NINLINER upon acceleration requirement judgment, and an operation for changing a gain of a feedback control for coinciding the actual rotation speed NIN with the target rotation speed NINLINE.

FIG. 15 is a time chart explaining a feedback gain switch operation of the above speed change control means 100, together with the operation of the gentle depression similar to that of FIG. 14. The timings $t_1$, $t_2$ and $t_3$ have the same meaning as that in FIG. 14. Based on the performance of acceleration requirement judgment at the timing $t_2$ in FIG. 15, the target rotation speed NILINE upon the acceleration increases stepwise to suddenly increase the control deviation e. Simultaneously, the proportion gain $C_P$ included in the above feedback control equation for speed change (C1) increases to a termination of the transition period, that is, until the deviation e ($N_{IN}$–NINLINE) between the target rotation speed NINLINE upon acceleration and the input shaft rotation speed $N_{IN}$ falls within the predetermined value M by a predetermined value.

As a result, in the transition period where the above control deviation e is larger than the predetermined value M (in FIG. 15, a time period from the timing $t_2$ to the timing $t_3$), a following responsibility to the target rotation speed NINLINE upon acceleration temporarily increases. Simultaneous with the increase of the proportion gain $C_P$, the integration gain $C_i$, due to a clear (initialization) to zero of a part up to the transition timing $t_3$, increases temporarily or transitionally in its control convergence. At least during the time period from the above acceleration requirement judgment timing $t_2$ to the transition period termination timing $t_3$, the belt nip force increases by the predetermined value in response to the increase of the proportion gain $C_P$, and the increase converges gently after termination of the transition period $t_3$ in the predetermined period.

Next explained is a case where the accelerator operation judging means 86 judges the re-acceleration operation of the accelerator pedal 71. In this case, the target drive force calculation means 92, the target output calculation means 94, the input shaft target rotation speed calculation means 96, and the target engine torque calculation means 98 perform the same control function as in the acceleration requirement judgment. Also, the input shaft target rotation speed calculation means 96 calculates the input shaft target rotation speed NINLINE upon re-acceleration as will be explained below, which is different form the acceleration requirement judgment.

That is, the target drive force calculation means 92 determines, similar to upon acceleration judgment, the target drive force FORCEACL upon the acceleration by the relation represented by the equation (5) and memorized in advance, based on the acceleration judgment initial drive force value FORCE0, the accelerator depression correction value FORCE (pap, spd), and the vehicle speed change correction value FORCE (spd). The target output calculation means 94 calculates, similar to upon acceleration judgment, the target output POWER by a relation represented by an equation (7) and memorized in advance, based on the target drive force FORCEACL upon acceleration calculated by the above target drive force calculation means 92 and the actual vehicle speed spd.

The input shaft target rotation speed calculation means 96 calculates, similar to upon acceleration judgment, the input shaft target rotation speed NINLINE by a relation represented by an equation (8) memorized in advance, based on the initial target rotation speed value NINLINE0 upon acceleration judgment, the accelerator open-degree correction value NIN (pap), the vehicle speed change correction value NIN (spd), and the accelerator speed correction value NIN (dspd, pap). The input shaft target rotation speed calculation means 96 calculates, upon judgment of the re-acceleration requirement, that is switching of a re-acceleration flag $F_{AA}$ from an off state to an on state, the input shaft target rotation speed NINLINE upon the re-acceleration. The calculation is performed by a relation represented by an equation (11) and memorized in advance, based on the input shaft target rotation speed NINLINE upon acceleration both calculated by the equation (8) and an accelerator speed correction value NIN (dpapreacl0, spd).

The above accelerator speed correction value NIN (dpapreacl0, spd) is determined by a function which increases as increase of the initial accelerator speed dpapreacl0 upon re-acceleration and the vehicle speed spd and which is memorized in advance, based on the actual initial accelerator speed dpapreacI0 upon re-acceleration and the vehicle speed spd. The target engine torque calculation means 98 calculates, similar to upon acceleration judgment, the target engine torque TE by a relation defined by an equation (10) and memorized in advance, based on the target output POWER upon acceleration calculated by the above target output calculation means 94 and the input shaft target rotation speed NINLINE upon acceleration calculated by the above input shaft target rotation speed calculation means 96.

$$\text{NINLINE}=\text{NINLINE}+NIN(dpapreacI0, spd) \quad (11)$$

Here, the NIN (dpapreacI0, spd) means an initial accelerator speed upon re-acceleration.

Figure 16:
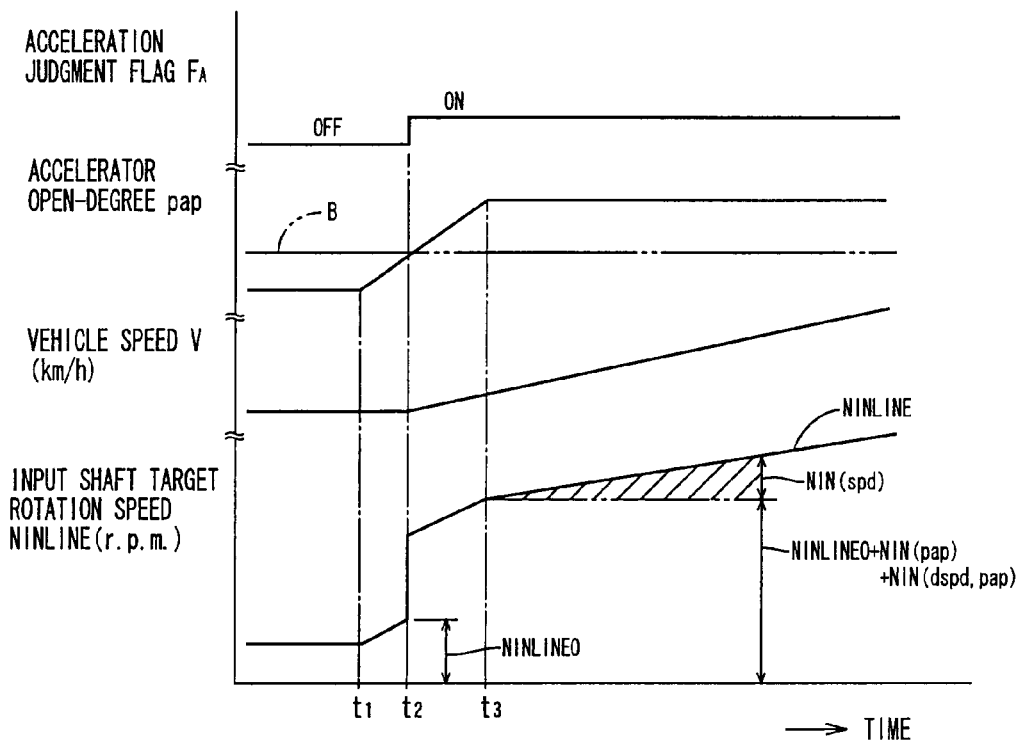
FIG. 16 is a timechart explaining a change of the target rotation speed NINLINE upon the acceleration requirement judgment in detail.
Figure 17:
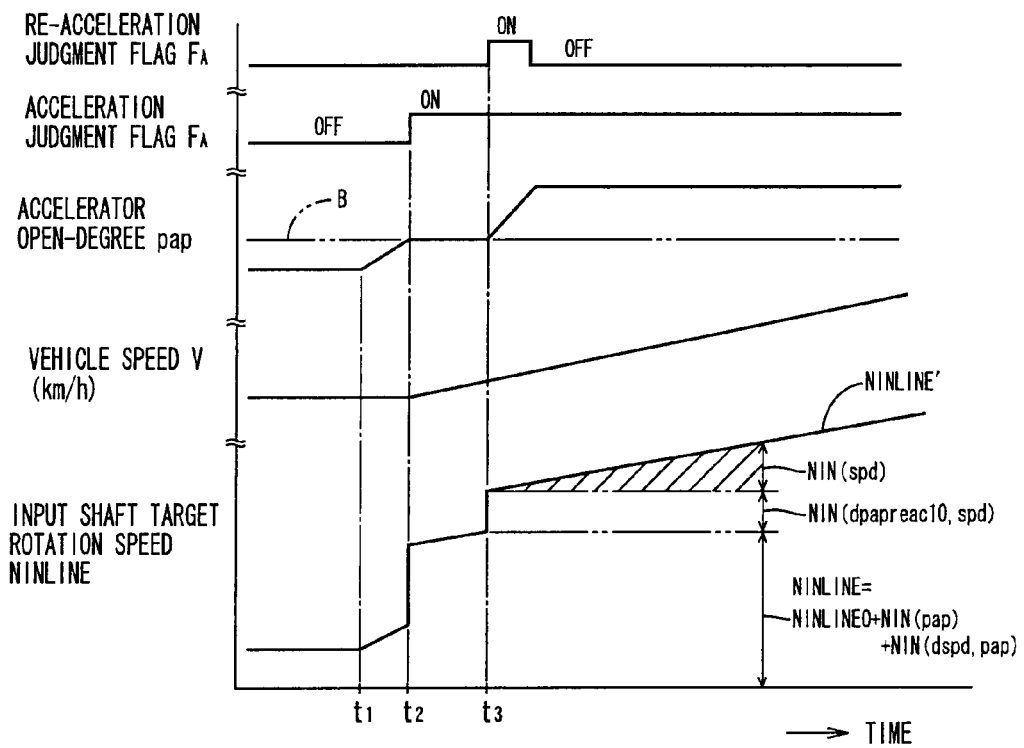
FIG. 17 is a timechart explaining a change of the target rotation speed NINLINE upon the re-acceleration requirement judgment in detail.

FIG. 16 is a view explaining a change of the input shaft target rotation speed NINLINE upon acceleration, while FIG. 17 is a view explaining a change of the input shaft target rotation speed NINLINE upon re-acceleration. In FIG. 16, the input shaft target rotation speed NINLINE upon acceleration increases, as can be understood by the equation (8), in two steps. First, at the acceleration requirement judgment timing $t_2$, it increases stepwise from the value NINLINE0 just before it to the initial value (=initial target rotation speed value NINLINE0 upon acceleration judgment+accelerator depression correction value NIN (pap)).

Second, by a transition period termination timing $t_3$ relating to the acceleration requirement operation of the accelerator pedal 71, the input shaft target rotation speed NINLINE upon acceleration further increases by the accelerator speed correction value NIN (dspd, pap), and then it increases linearly and gently in accordance with increase of a vehicle speed change correction value (vehicle speed integration section) NIN (spd). A hatched area in FIG. 16 reveals an increased part by the vehicle speed change correction value (vehicle integration section) NIN (spd).

On the contrary, FIG. 17 representing the re-acceleration requirement state shows the judgment of the re-acceleration requirement at the timing $t_3$ succeeding to the acceleration requirement operation judgment timing $t_2$. In this case, as understood by the equation (11), at the timing $t_3$, the initial accelerator speed NIN (dpapreacI0, spd) upon re-acceleration is further added to the input shaft target rotation speed NINLINE upon acceleration such that the input shaft target rotation speed NINLINE upon re-acceleration increases stepwise. Then, similar to in upon acceleration requirement, it increases linearly and gently in accordance with the increase of the vehicle speed change correction value (vehicle integration value) NIN (spd). At the re-acceleration requirement judgment timing $t_3$, the input shaft target rotation speed NINLINE or the initial value (=initial target rotation speed value NINLINE0 upon acceleration judgment+accelerator depression correction value NIN (pap)) which is larger at the timing just before the re-acceleration requirement judgment is selected (max selected). A change just after the acceleration requirement judgment is shown in FIG. 17.

Figure 18:
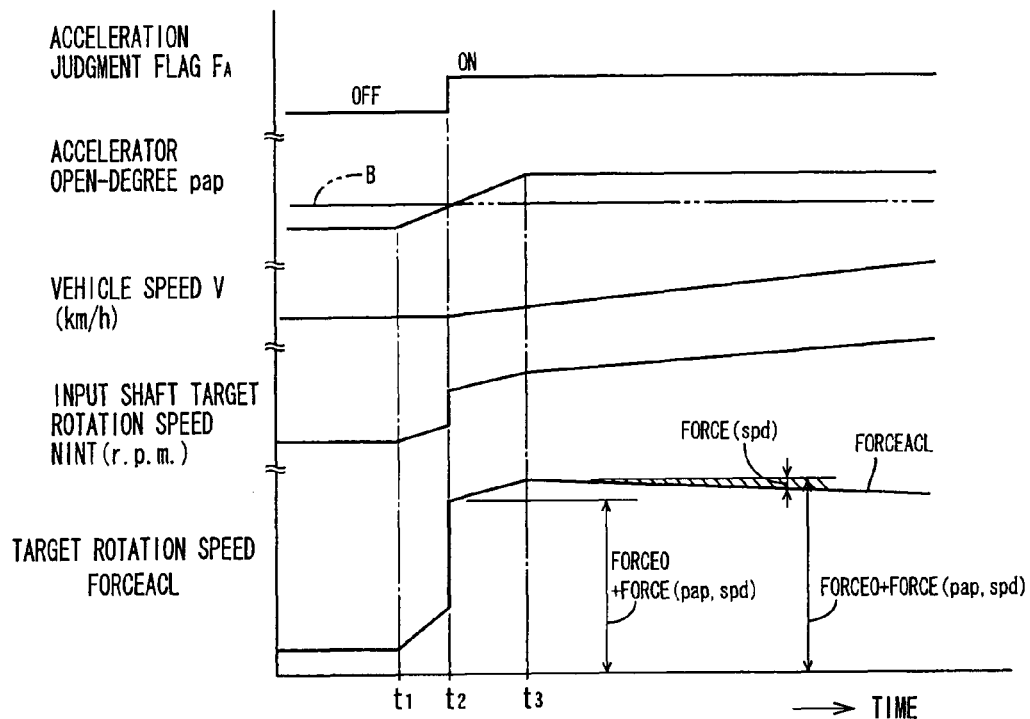
FIG. 18 is a timechart explaining a change of the target drive force FORCEACL upon the acceleration requirement judgment in detail.
Figure 19:
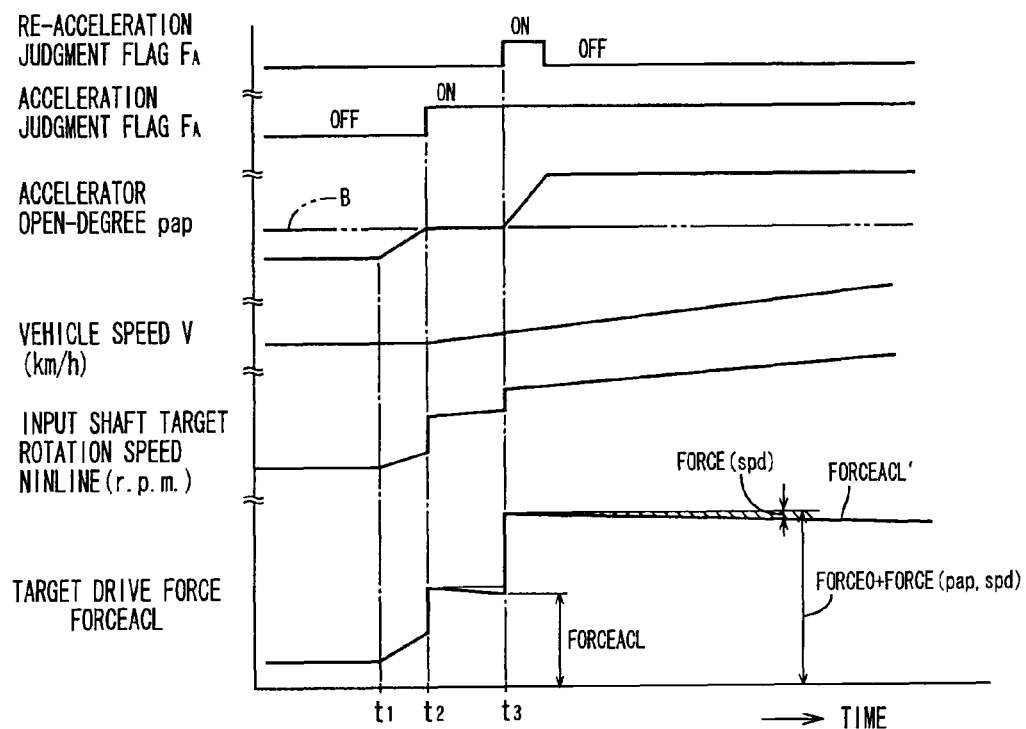
FIG. 19 is a timechart explaining a change of the target drive force FORCEDCL upon the re-acceleration requirement judgment in detail.

FIG. 18 is a view explaining a change of the target drive force FORCEACL upon acceleration, and FIG. 19 is a view explaining a change of the target drive force FORCEACL upon re-acceleration. In FIG. 18, the target drive force FORCEACL upon acceleration increases, as understood in the equation (5), in two steps. First, at the acceleration requirement judgment timing $t_2$, it increases stepwise from the value FORCE0 just before it to the initial value (=acceleration depression correction value FORCE (pap, spd)).

Second, by a transition period termination timing $t_3$ relating to the acceleration requirement operation of the accelerator pedal 71, the target drive force FORCEACL upon acceleration further increases by an increased part of the accelerator depression correction value FORCE (pap, spd) with increase of the vehicle speed, and then it decreases linearly and gently in accordance with decrease of the vehicle speed change correction value (vehicle speed integration section) FORCE (spd). A hatched area in FIG. 18 shows a change part by the vehicle speed change correction value (vehicle speed integration section) FORCE (spd).

On the contrary, FIG. 19 representing the re-acceleration requirement state shows the judgment of the re-acceleration requirement at the timing $t_3$ succeeding to the acceleration requirement operation judgment timing $t_2$. In this case, as understood by the equation (5), at the timing $t_3$, the value FORCEACL at the timing $t_2$ is used as the value FORCE0 just before it, and the acceleration depression correction value FORCE (pap, spd) is further added thereto such that the target drive force FORCEACL upon re-acceleration increases stepwise. Then, similar to upon acceleration requirement state, it decreases linearly and gently in accordance with the decrease of the vehicle speed change correction value (vehicle speed integration section) FORCE (spd). At the re-acceleration requirement judgment timing $t_3$, the target drive force FORCEACL upon acceleration or the accelerator depression correction value which is larger at the timing just before the re-acceleration requirement judgment is selected (max selected). A change just after the acceleration requirement judgment is shown in FIG. 19.

Next explained is a case when the accelerator operation judging means 86 judges the slowdown requirement operation of the accelerator pedal 71. In this case, similar to upon above acceleration judgment, the target drive force calculation means 92 calculates a target drive force FORCEDCL upon slowdown by a relation represented by an equation (12) and memorized in advance, based on the acceleration judgment initial drive force value FORCE0, the accelerator depression correction value FORCE (pap, spd) and the vehicle speed change correction value FORCE (spd). In this slowdown requirement, the vehicle speed change correction value (vehicle speed integration section) FORCE (spd) calculated by an equation (13) has the negative value. The target output calculation means 94 calculates the target output POWER, similar to upon acceleration requirement, by a relation represented by an equation (14) and memorized in advance, based on a target drive force FORCEDCL upon slowdown calculated by the above target drive force calculation means 92 and the actual vehicle speed spd.

The input shaft target rotation speed calculation means 96 calculates a input shaft target rotation speed NINLINE upon slowdown, by a relation represented by an equation (15) and memorized in advance, based on the actual initial target rotation speed value NINLINE0 upon slowdown requirement, the accelerator open-degree correction value NIN (pap) and the accelerator speed correction value NIN (dspd, pap). The target engine torque calculation means 98 calculates, similar to upon the above acceleration judgment, the target engine torque TE, by the relation represented by the equation (10) based on a target output POWER upon slowdown calculated by the above target output calculation means 94 and an input shaft target rotation speed NINLINE upon the slowdown calculated by the above input shaft target rotation speed calculation means 96.

$$\text{FORCEDCL}=\text{FORCE0}+\text{FORCE}(pap,spd)+\text{FORCE}(spd) \quad (12)$$

$$\text{FORCE}(spd)=[\alpha(spd,pap)\times(spd^1-spd^{1-1})] \quad (13)$$

$$\text{and } [\alpha(spd,pap)\times(spd^1-spd^{1-1})]\square 0$$

$$\text{POWER} \propto \text{FORCEDCL}/spd \quad (14)$$

$$\text{NINLINE}=\text{NINLINE0}+\text{NIN}(pap)+\text{NIN}(dspd,pap) \quad (15)$$

The above input shaft target rotation speed calculation means 96 always calculates the initial target input rotation speed NINLINE0 upon acceleration by the equation (12), and produces the change of the target rotation speed NINLINE upon slowdown with giving the rotation number correction stored therein to the next acceleration requirement. As understood from an equation (15), the vehicle speed change correction value (vehicle speed integration section) NIN (spd) is removed or cleared. Also, the above input shaft target rotation speed calculation means 96 calculates, during the transition period upon slowdown requirement judgment, an input shaft target rotation speed NINT upon transition. In detail, this target rotation speed NINT upon transition is calculated to change the actual input shaft rotation speed $N_{IN}$ smoothly or gently, for example by a temporarily delay speed or a constantly changing speed, relative to the target rotation speed NINLINE upon slowdown.

Figure 20:
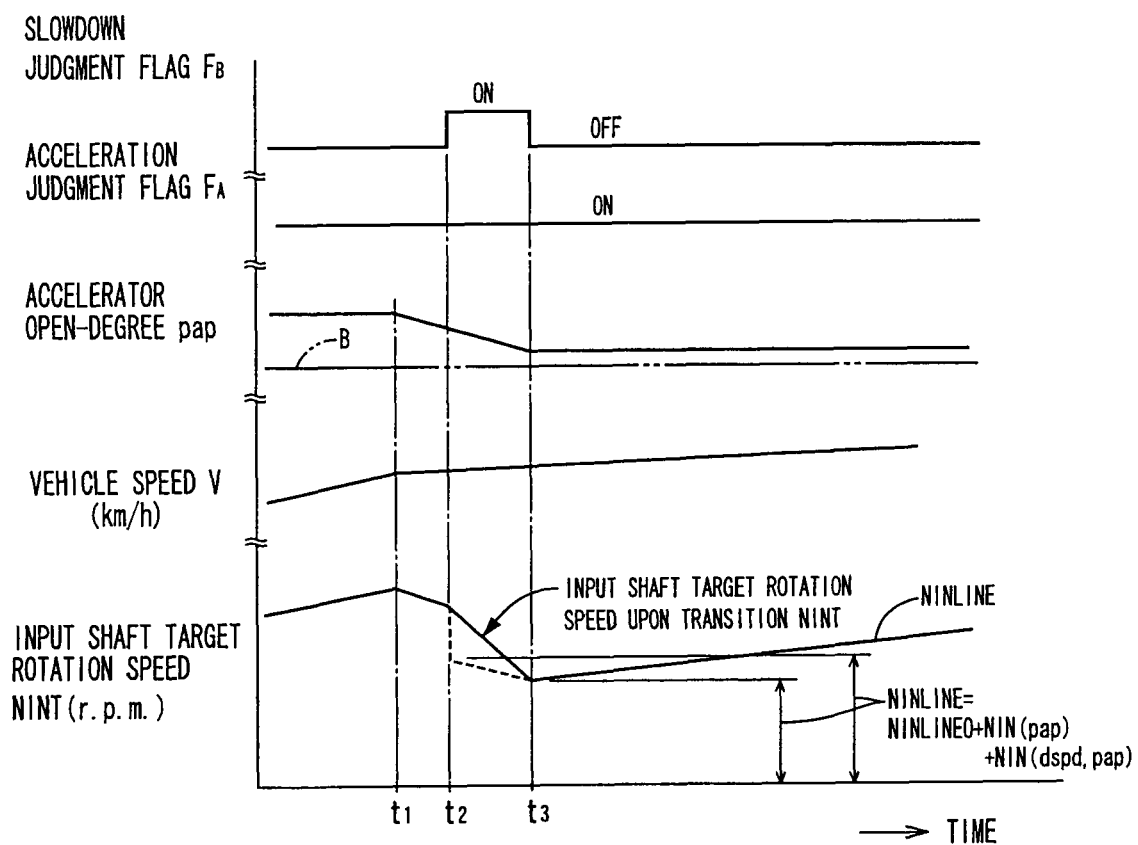
FIG. 20 is a timechart explaining the target rotation speed NINLINE upon the slowdown requirement judgment.

FIG. 20 is a view explaining a change of the input shaft target rotation speed NINLIE upon slowdown. At the slowdown requirement judgment timing $t_2$, as shown by the broken line, the target shaft target rotation speed NINLEE upon slowdown requirement decreases stepwise, due to subtraction of the negative accelerator open-degree correction value NIN (pap) and the accelerator speed correction value NIN (dspd, pap) from the initial target rotation speed NINLINE0 upon slowdown judgment. It gradually decreases toward the value at the transition period termination timing $t_3$ calculated in response to decrease of the accelerator open-degree pap. This value NINLINE during the decreased time period (from $t_2$ to $t_3$) corresponding to the target value in another acceleration judgment is called as a "final target value" because it forms the target value upon another acceleration judgment.

The target rotation speed NINT upon transition linearly decreases from the initial target rotation speed value NINLINE0 NINLINE0 upon slowdown judgment (=input shaft target rotation speed NINLINE upon acceleration just before the slowdown judgment) to the value at the transition period termination timing $t_3$, gently as shown by the solid line. Such decreasing manner is different from that of the input shaft target rotation speed NINLINE upon slowdown which decreases stepwise as shown by the broken line. Stoppage of the decrease of the accelerator open-degree pap switches the judgment from the slowdown judgment to the acceleration judgment, and from now on the target rotation speed NINLINE upon acceleration will be determined in accordance with the above equation (8).

That is, in the slowdown transition period, in response to the slowdown requirement judgment, an initial value of the target rotation speed and a transition target rotation speed NINT are calculated. In detail, the initial value (=initial target rotation speed value NINLINE0 upon slowdown judgment+accelerator depression correction value NIN(pap)+accelerator speed correction value NIN (dspd, pap)) of the target rotation speed which is the basic value upon acceleration requirement is calculated based on the accelerator open-degree pap. Also, the transition target rotation speed NINT which gradually decreases from the target rotation speed NINLINE upon acceleration just before the slowdown judgment is serially calculated in accordance with the changing rate based on the change degree of the output requirement amount.

Before the transition target rotation speed NINT reaches the above initial value (final value) which is the basic value upon acceleration requirement, the transition target rotation speed NINT is set as the target rotation speed NINLINE upon acceleration, while after the transition target rotation speed NINT reaches the basic value upon acceleration requirement, the basic value is set as the target rotation speed NINLINE upon acceleration.

Figure 21:
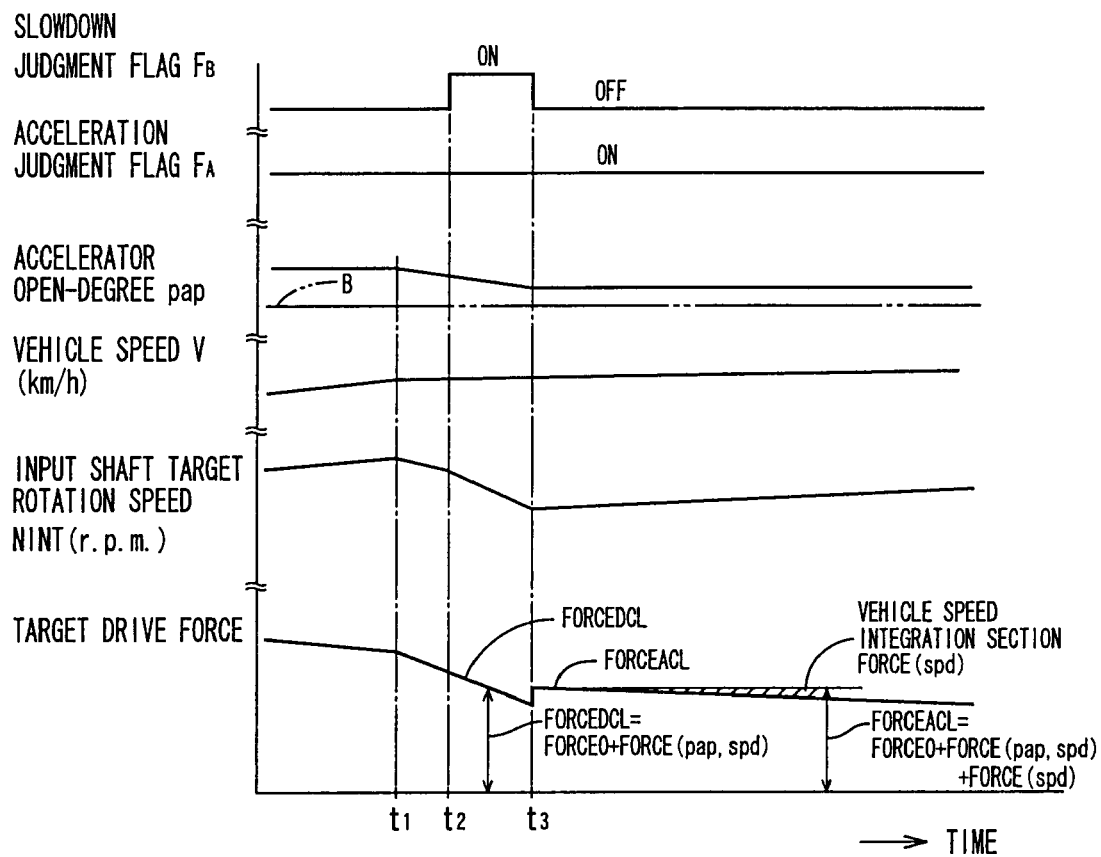
FIG. 21 is a time chart explaining a change of the target drive force FORCEACL upon the slowdown requirement judgment in detail.

FIG. 21 is a view explaining a change of the above target drive force FORCEDCL upon slowdown. In FIG. 21, the target drive force FORCEDCL upon the slowdown is calculated, similar to upon acceleration judgment, by the relation represented by the equation (5) and memorized in advance, based on the acceleration judgment initial drive force FORCE0, the accelerator depression correction value FORCE (pap, spd) and the vehicle speed change correction value FORCE (spd), being decreased in the decreased area of the accelerator open-degree pap during the time period from $t_1$ to $t_3$ accordingly. In this slowdown requirement period, the vehicle speed change correction value (vehicle speed integration section) included in the equation (5) FORCE (spd) basically intends to decrease the drive force during the slowdown judgment, and therefore the accumulated part at every moment has a value below zero for preventing the drive force increase. For this reason, upon acceleration requirement start at the timing $t_3$, the stepwise increase of the target drive force FORCEACL upon acceleration to which the vehicle speed change correction value (vehicle speed integration section) is added is small.

The above explained control can be summarized as below. The controlling means 90 sets, upon judgment by the accelerator operation judging means 86 functioning as the acceleration requirement judgment means, the target drive force POWER higher than the target drive force upon normal calculated in the normal operation of the accelerator pedal 71, and sets the target rotation speed NINLINE upon acceleration higher than the target rotation speed upon normal calculated in the normal operation, and increases by a predetermined gradient β relative to the increase of the vehicle speed. For achieving the target drive force POWER set and for coinciding the input shaft rotation speed NIN of the continuously variable transmission 18 with the above target rotation speed for acceleration set, both the speed change ratio γ of the continuously variable transmission 18 and the output torque of the engine 12 are controlled.

In this way, in response to the acceleration requirement by the driver, the target drive force increases and the output rotation speed of the power source rises, so that accelerating feeling of the vehicle which is sufficiently high relative to the required output amount can be obtained. Especially, due to the close relevancy (=linearity) between the vehicle acceleration and the change of output rotation speed obtained, a linear feeling upon acceleration can be obtained.

In addition, the above controlling means 90 sets, upon judgment of the acceleration requirement by the accelerator operation judging means 86, by the accelerator depression correction value NIN (pap) the target rotation speed NINLINE for acceleration such that the input shaft rotation speed NIN of the continuously variable transmission 18 increases as the accelerator open-degree (output requirement amount: depressed amount) pap becomes large. In this way, sufficient accelerating feeling responsive to the driver's requirement output amount can be obtained.

Further, the above controlling means 90 feedback-controls the input shaft rotation speed $N_{IN}$ to be coincided with the target rotation speed NINLINE. The controlling means 90 increases, upon judgment of the acceleration requirement by the accelerator operation judging means 86, the proportion gain Ci of the feedback control until the deviation e ($N_{IN}$-NINLINE) between the target rotation speed NINLINE for acceleration and the input shaft rotation speed $N_{IN}$ falls within the predetermined value M, whereby the responsibility of drive force relative to the required output can be increased. Thus, the favorable accelerating feeling can be obtained.

Further, the controlling means 90 increases, upon the judgment of re-acceleration requirement operation of the accelerator pedal 71 by the accelerator operation judging means 86 functioning as the re-acceleration judgment means, as understood by the equation (11), the target drive force NINLINE upon acceleration set upon acceleration requirement as the initial value. Thus, setting of the input shaft target rotation speed NINLINE upon re-acceleration in which the target rotation speed NINLINE upon acceleration set upon acceleration requirement increases stepwise regardless of the increase of vehicle speed, can improve the accelerating feeling upon re-acceleration requirement.

In addition, the controlling means 90, in a following predetermined state, gradually makes the above target drive force FORCEDCL small and gradually makes the above target rotation speed NINLINE upon acceleration small upon slowdown requirement judgment of the accelerator pedal 71 by the accelerator operation judging means 86. Here, in the above predetermined state, in response to the judgment of the acceleration requirement operation of the accelerator pedal 71 by the accelerator operation judging means 86, the target drive force FORCEACL is increased and the target rotation speed NINLINE upon acceleration is set. For this reason, even upon slowdown requirement during the acceleration requirement, both the drive force and the rotation speed change smoothly for achievement of the smooth slowdown.

Further, the above controlling means 90, in a following predetermined state, gradually makes the target rotation speed NINLINE upon acceleration toward the target rotation speed NINLINE upon acceleration which is set at the timing ($t_3$) of the acceleration requirement judgment determined in advance in a mode determined in advance upon slowdown requirement judgment of the accelerator pedal 71 by the accelerator operation judging means 86. Here, in the above predetermined state, in response to the judgment of the acceleration requirement operation of the accelerator pedal 71 by the accelerator operation judging means 86 the target drive force FORCEACL is increased, and the target rotation speed NINLINE upon acceleration is set. For this reason, the acceleration responsibility of vehicle in the re-acceleration requirement after the slowdown requirement can be improved.

In addition, the controlling means 90 controls, on condition of the above road surface judgment means 88 judging the non-running road surface of low frictional coefficient, upon the judgment of acceleration requirement, the speed change ratio γ of the continuously variable transmission 18 and the output torque of the engine 12 such that the target drive force FORCEACL set is achieved, and the input shaft rotation speed NIN of the above continuously variable transmission 18 coincides with the target rotation speed NINLINE upon acceleration set. For this reason, deterioration of vehicle running property on the running road surface of low frictional coefficient can be prevented.

Figure 22:
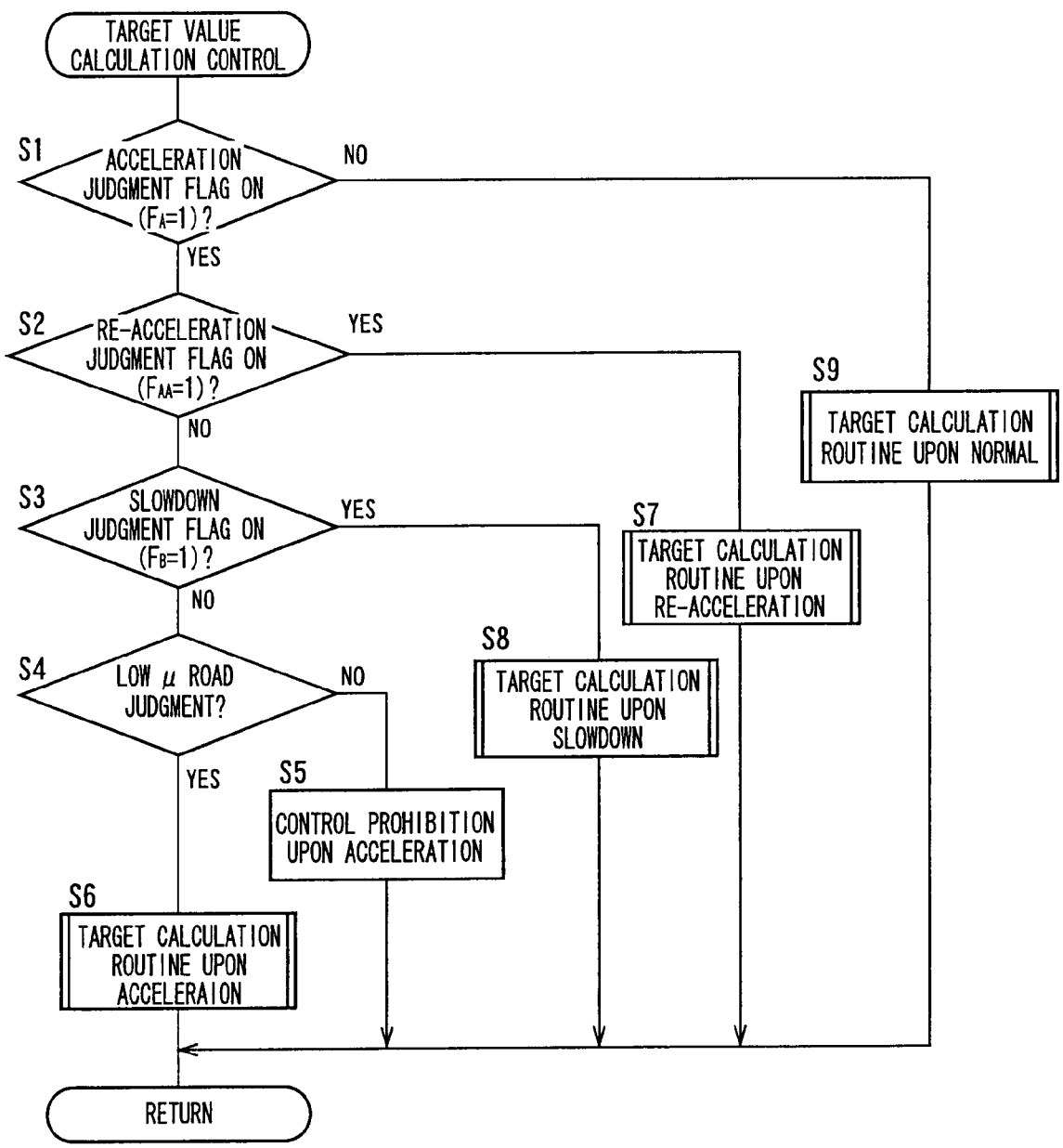
FIG. 22 is a flowchart explaining the main portion of the control operation by the electronic control device shown in FIG. 4.

FIG. 22 is a flow chart explaining a main part of the control operation by the electronic control device 66, and a sequence disclosed herein is repeated by a predetermined cycle time for example by a frequency of few ten of mili-seconds. In FIG. 22, in steps S1 to S3 corresponding to the accelerator operation judging means 86, whether any of an accelerator requirement flag $F_A$, a re-acceleration requirement flag $F_{AA}$ and a slowdown requirement flag $F_B$ is in an on state i.e., a set state or not, is judged. On state ($F_A$=1) of the acceleration requirement flag $F_A$ exhibits the acceleration requirement judgment by the accelerator pedal 71, on state ($F_{AA}$=1) of the re-acceleration requirement flag $F_{AA}$ exhibits the re-acceleration requirement judgment by the accelerator pedal 71, and on state ($F_B$=1) of the slowdown requirement flag $F_B$ exhibits the slowdown requirement judgment by the accelerator pedal 71

Figure 23:
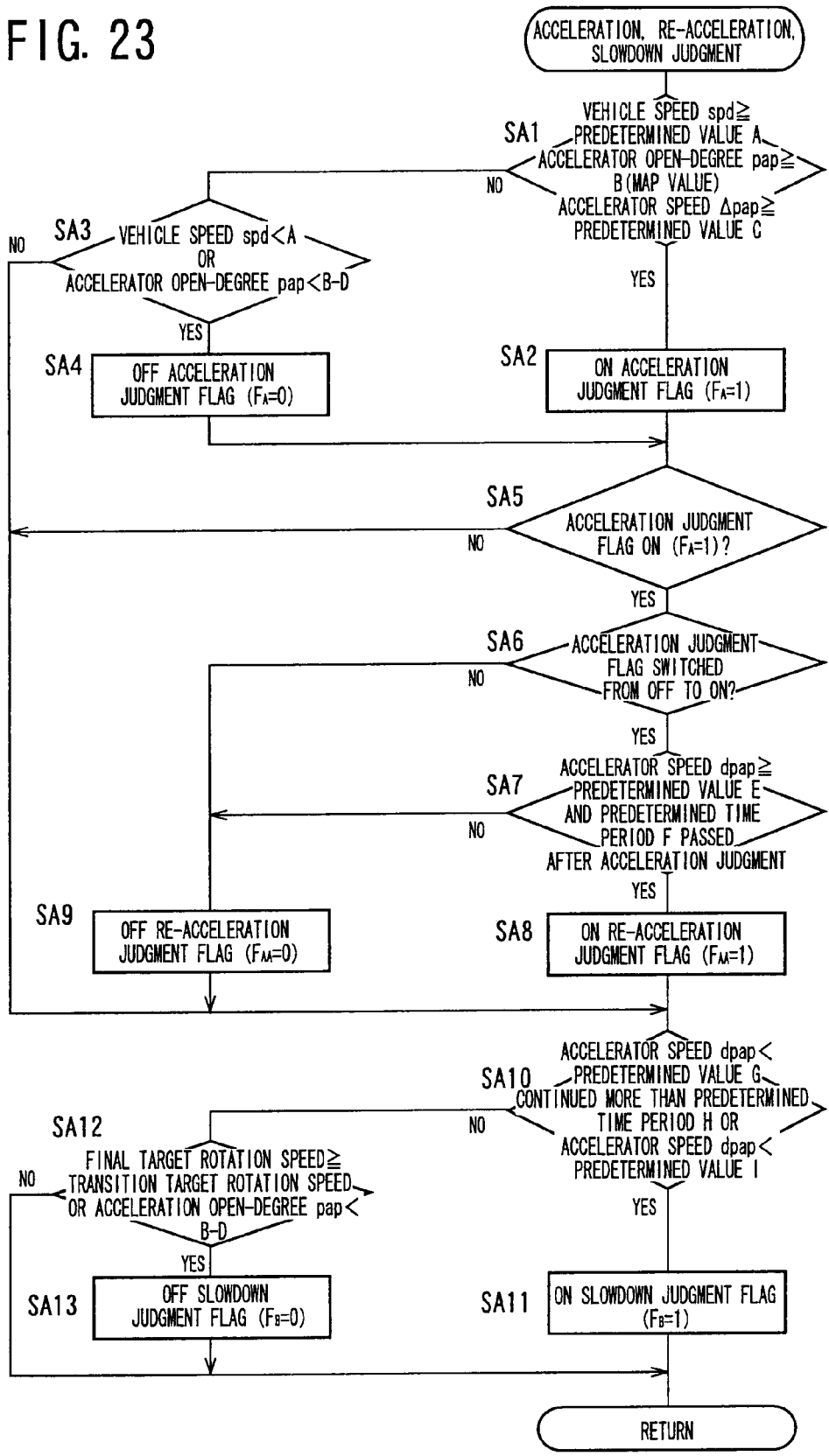
FIG. 23 is a flowchart explaining a routine for controlling on-off of a flag shown in FIG. 22.

On-off state of the acceleration requirement flag $F_A$, the re-acceleration requirement flag $F_{AA}$ and the slowdown requirement flag $F_B$ are controlled by routines shown in FIG. 23 which are performed in parallel by an interruption and the like. At a step SA1 in FIG. 23, whether the vehicle speed spd is larger than a judgment value A preset, the accelerator open-degree pap is larger than a judgment value B preset, and the accelerator speed dpap is larger than a judgment value C preset or not, are judged. Upon affirmation of the step SA1 judgment, in a step SA2, the accelerator requirement flag FA is set (on) to "1". However, upon denial of the step SA1 judgment, in a step SA3, whether the vehicle speed spd is smaller than the value A preset, or the accelerator open-degree pap is lower than a value (B-D) preset or not, are judged. Upon affirmation of the step SA3 judgment, in a step SA4, completion of the acceleration requirement operation is judged and the above acceleration requirement flag $F_A$ is reset (off) to "0". In the event of denial of the step SA3 judgment, a sequence of a step SA10 and thereafter to be explained later is performed.

Next, in a step SA5, whether the acceleration requirement flag $F_A$ is set to "1" or not, is judged. Upon denial of the step SA5 judgment, the sequence of the step SA10 and thereafter to be explained later is performed, but upon affirmation of the step SA5 judgment, in a step SA6, whether the accelerator requirement flag $F_A$ is switched from the off state to the on state or not, is judged. Upon affirmation of the step SA6 judgment, in a step SA7, whether the accelerator speed dpap is larger than a judgment value E preset and a time period longer than a predetermined value F passes from the above acceleration judgment or not, are judged. Upon affirmation of the step SA7 judgment, in a step SA8, the re-acceleration requirement flag $F_{AA}$ is set (on) to "1". However, upon denial of the step SA7 or the step SA8 judgment, after the re-acceleration requirement flag $F_{AA}$ is reset (off) to "0" in a step SA9, the sequence of the step SA10 and thereafter to be explained later is performed.

In the step SA10, whether continuation of a state the accelerator speed dpap (negative value) being lower than a judgment value G preset is longer than a predetermined time period H, or the accelerator speed dpap is lower than a judgment value I (<G) preset or not, is judged. Upon affirmation of the step SA10 judgment, in a step SA11, whether the slowdown flag $F_B$ is set to "1". Upon denial of the step SA10 judgment, in a step SA12, whether the final target rotation speed NINLINE is larger than the transition target rotation speed NINT, or the accelerator open-degree pap is lower than the judgment value (B-D) preset, is judged. Upon affirmation of the step SA12 judgment, in a step SA13, the above slowdown flag $F_B$ is reset (off) to "0", but upon denial of the step SA12 judgment the routine ends.

Figure 26:
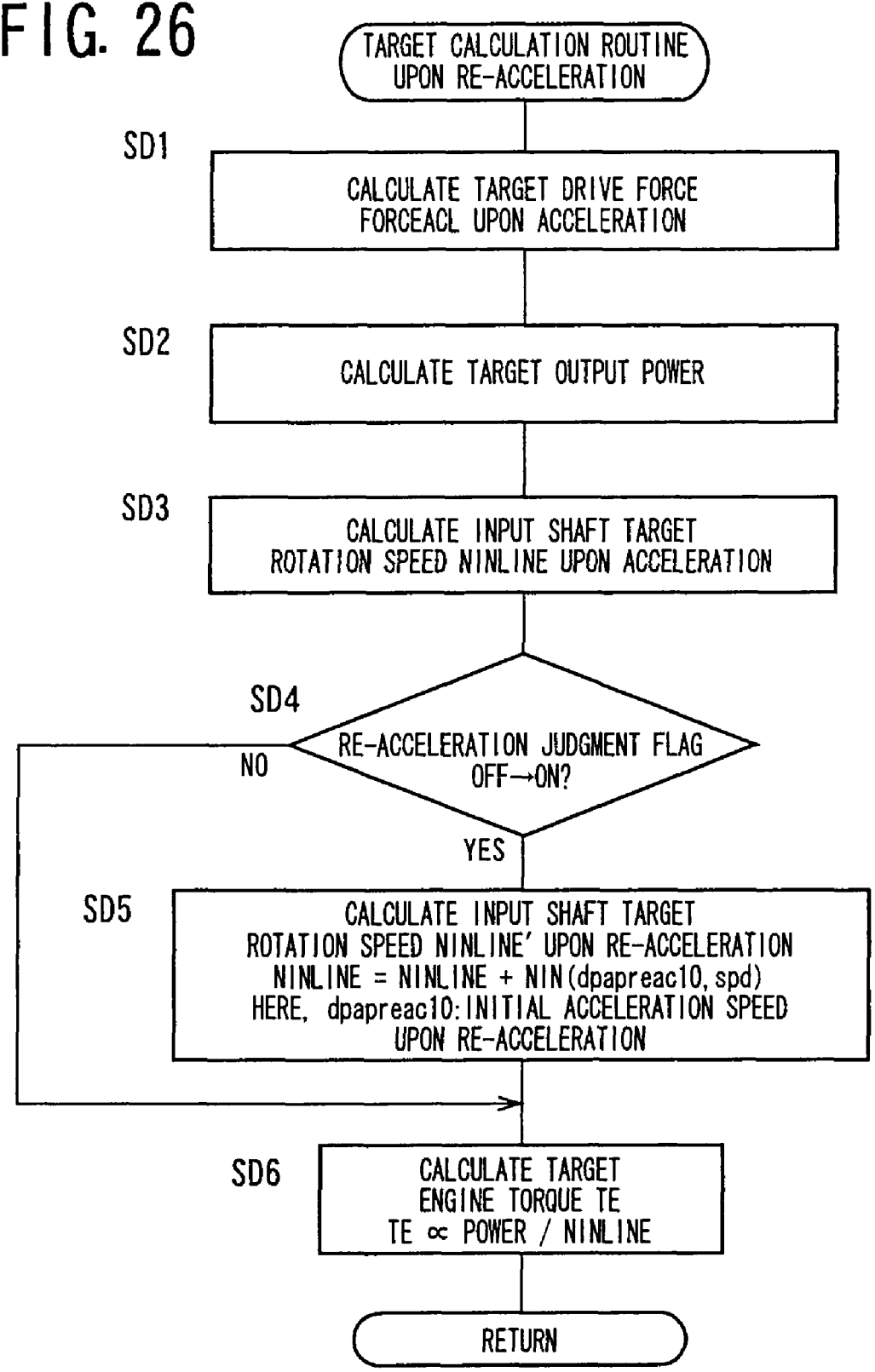
FIG. 26 is a flowchart explaining a target calculation routine upon re-acceleration shown in FIG. 22.
Figure 27:
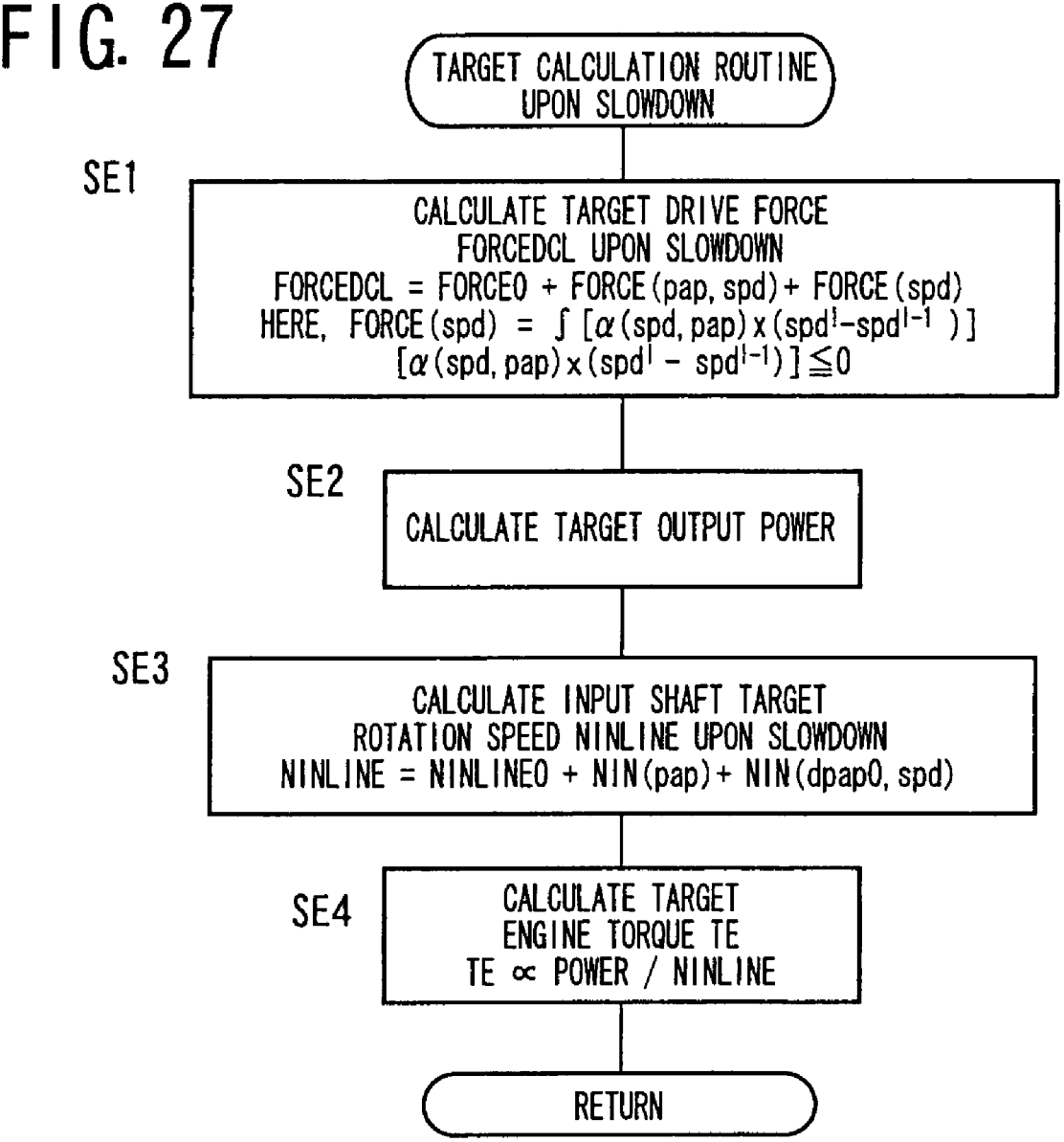
FIG. 27 is a flowchart explaining a target calculation routine upon slowdown of FIG. 22.

Returning to FIG. 22, upon affirmation of the step S1 judgment due to the acceleration requirement flag $F_A$ being set to "1", in a step S9, a target calculation routine upon normal is performed. Upon denial of the step S1 judgment, in a step S2, whether the re-acceleration requirement flag $F_{AA}$ is set or not, is judged. Upon affirmation of the step S2 judgment, in a step S7, the target calculation routine upon re-acceleration shown in FIG. 26 is performed, but upon denial of the step S2 judgment, in a step S3, whether the slowdown flag $F_B$ is set to "1" or not, is judged. Upon affirmation of the step S3 judgment, in a step S8, the target calculation routine upon slowdown shown in FIG. 27 is performed, but upon denial of the step S3 judgment, in a step S4 corresponding to the above road surface judgment means 88, whether running road surface of the vehicle is the low μ road surface or not, is judged. Upon affirmation of the step S4 judgment, a control prohibition upon acceleration of a step S5 is performed, but upon denial of the step S4 judgment, in a step S6, a target calculation routine upon acceleration shown in FIG. 25 is performed.

Figure 24:
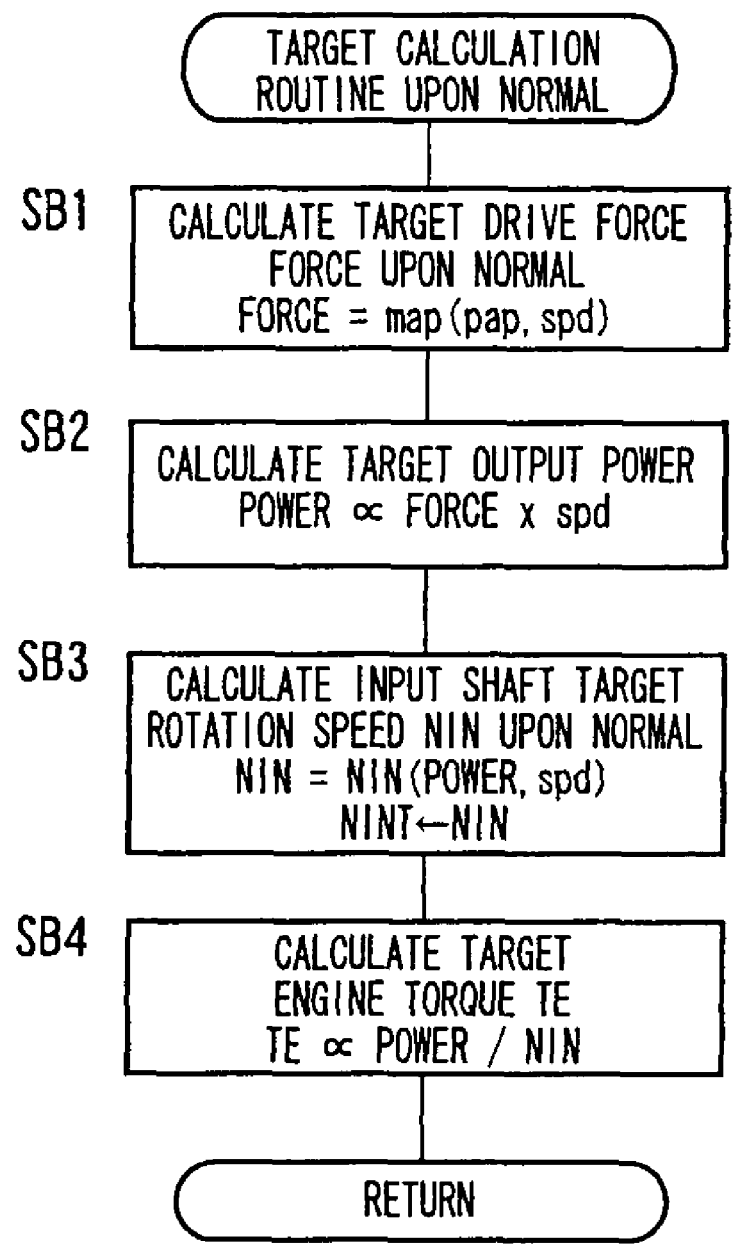
FIG. 24 is a flowchart explaining a target calculation routine upon normal shown in FIG. 22.

In the target calculation routine upon normal shown in FIG. 24, in a step SB1 corresponding to the above target drive force calculation means 92, the target drive force FORCE upon normal is calculated by the relation represented by the equation (1) and memorized in advance, based on the actual vehicle speed spd and the accelerator open-degree pap. Next, in a step SB2 corresponding to the above target output calculation means 94, the target output POWER is calculated by the relation represented by the equation (2) and memorized in advance, based on the above target drive force FORCE calculated by the above target drive force calculation means 92 and the actual vehicle speed spd. Next, in a step SB3 corresponding to the above input shaft target rotation speed calculation means 96, the input shaft target rotation speed NIN upon normal is calculated by the relation represented by the equation (3) and memorized in advance, based on the above target output POWER upon normal and the actual vehicle speed spd. In a step SB4 corresponding to the above target engine torque calculation means 98, the target engine torque TE is calculated by the relation represented by the equation (4) and memorized in advance, based on the above target output POWER upon normal calculated by the above target output calculation means 94 and the input shaft target rotation speed NIN upon normal calculated by the above input shaft target rotation speed calculation means 96.

Figure 25:
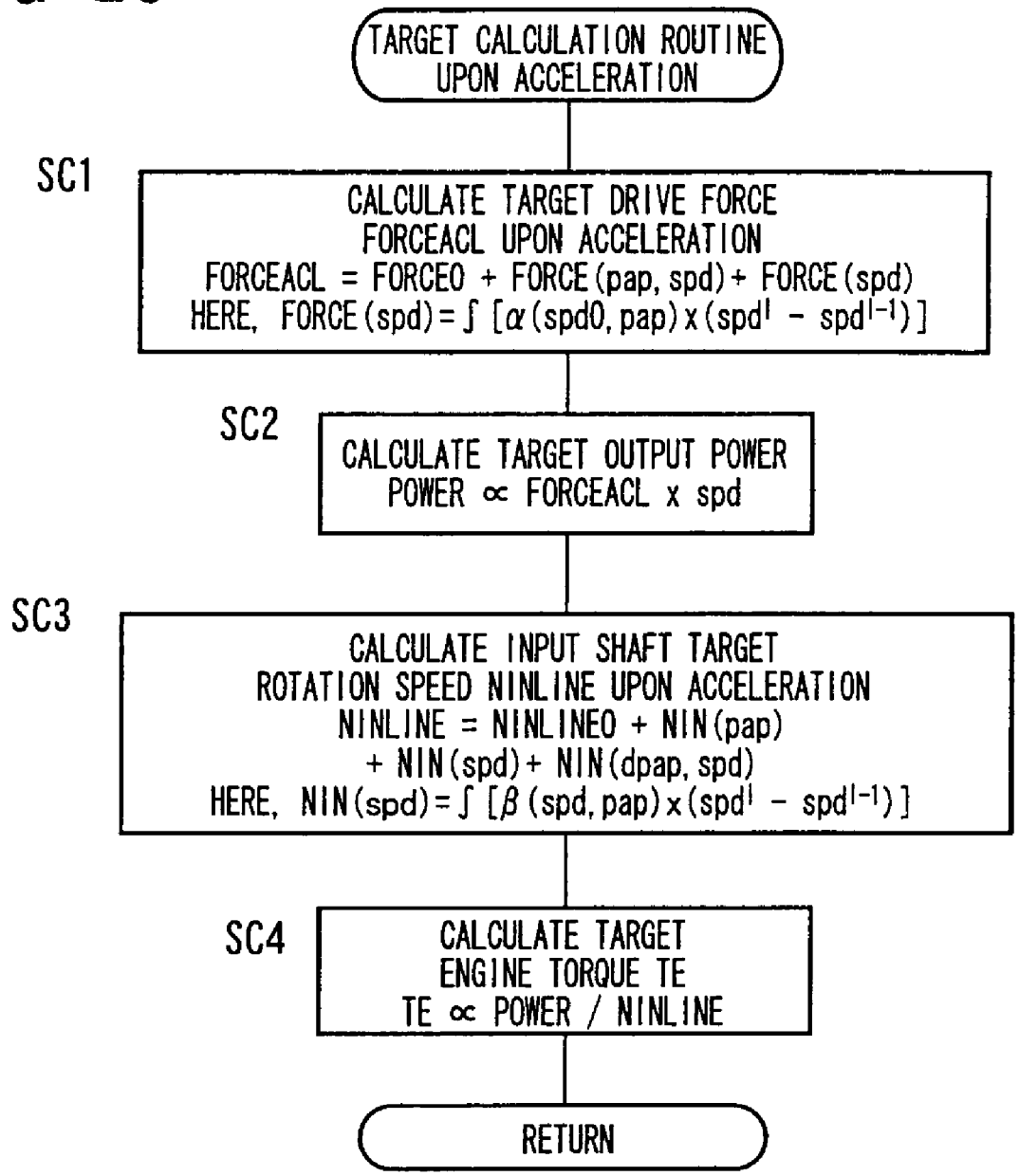
FIG. 25 is a flowchart explaining a target calculation routine upon acceleration shown in FIG. 22.

In a target calculation routine upon acceleration shown in FIG. 25, in a step SC1 corresponding to the above target drive force calculation means 92, the target drive force FORCEACL upon acceleration is calculated by the relation represented by the equation (5) and memorized in advance, based on the acceleration judgment initial drive force value FORCE0, the accelerator depression correction value FORCE (pap, spd), and the vehicle speed change correction value (vehicle speed integration section) FORCE (spd). Next, in a step SC2 corresponding to the above target output calculation means 94, the target output POWER is calculated by the relation represented by the equation (7) upon normal and memorized in advance similar to the equation (2), based on the target drive force FORCEACL upon acceleration calculated by the above target drive force calculation means 92 and the actual vehicle speed spd.

Next, in a step SC3 corresponding to the input shaft target rotation speed calculation means 96, the input shaft target rotation speed NINLINE upon acceleration is calculated, by the relation represented by the equation (8) and memorized in advance, based on the initial target rotation speed value NINLINE0 upon acceleration judgment, the accelerator depression correction value NIN (pap), the vehicle speed change correction value NIN (spd), and the accelerator speed correction value NIN (dspd, pap). Next, in a step SC4 corresponding to the above target engine torque calculation means 98, the target engine torque TE is calculated by the relation represented by the equation (10) and memorized in advance similar to the equation (4), based on the target output POWER upon acceleration calculated by the above target output calculation means 94 and the input shaft target rotation speed NINLINE upon acceleration calculated by the above input shaft target rotation speed calculation means 96.

As a result, the above input shaft target rotation speed NINLINE increases, in FIG. 7, from the initial value of the acceleration operation corresponding to the upper position of the broken line, by the predetermined rate β as shown by the solid line as increase of the vehicle speed spd. Also, upon the quick depression operation of the accelerator pedal 71, the input shaft target rotation speed NINLINE changes as shown in FIG. 13. Upon the gentle depression operation of it, the input shaft target rotation speed NINLINE changes as shown in FIG. 14, and the target drive force FORCEACL upon the acceleration changes as shown in FIG. 18.

In the target calculation routine upon re-acceleration shown in FIG. 26, a step SD1 corresponding to the above target drive force calculation means 92, a step SD2 corresponding to the above target output calculation means 94, and a step SD3 corresponding to the above input shaft target rotation speed calculation means 96 respectively perform their sequences similar to the above steps SC1, SC2 and SC3 in the target calculation routine upon acceleration.

Next, in a step SD4, whether the re-acceleration requirement flag $F_{AA}$ is switched from "0" to "1" or not, is judged. Upon denial of the step SD4 judgment, in a step SD6 corresponding to the above target engine torque calculation means 98 sequence is performed similar to the step SC4 in the above target calculation routine upon acceleration. However, upon affirmation of the above step SD4 judgment, in a step SD5 corresponding to the above input shaft target rotation speed calculation means 96, the input shaft target rotation speed NINLINE upon re-acceleration is calculated by the relation represented by the equation (11) and memorized in advance, based on the input shaft target rotation speed NINLINE upon acceleration and the accelerator speed correction speed NIN (dpapreacl0, spd) calculated by the above equation (8).

As a result, the above input shaft target rotation speed NINLINE upon re-acceleration increases stepwise as shown in FIG. 17, at the timing $t_3$, due to addition of the initial accelerator speed NIN (dpapreacl0, spd) upon re-acceleration to the input shaft target rotation speed NINLINE upon acceleration as understood by the equation (11). Then, it increases, similar to in the acceleration requirement, linearly and gently in response to the increase of the vehicle speed change correction value (vehicle speed integration section) NIN (spd). Also, the target drive FORCEACL upon re-acceleration uses, as shown in FIG. 19, the value FORCEACL at the timing $t_2$ as the value FORCE0 just before it, and the accelerator depression correction value FORCE (pap, spd) is added thereto, so that the drive force upon re-acceleration increases stepwise. Thereafter, the target drive FORCEACL upon re-acceleration, similar to upon acceleration requirement, linearly or gently decreases in accordance with the decrease of the vehicle speed change correction value (vehicle speed integration section) NIN (spd).

In the target calculation routine upon slowdown shown in FIG. 27, in a step SE1 corresponding to the above target drive force calculation means 92, the target drive force FORCEDCL upon slowdown is determined, similar to upon acceleration judgment, by the relation represented by the equation (12) and memorized in advance, based on the acceleration judgment initial drive force FORCE0, the accelerator depression correction value FORCE (pap, spd) and the vehicle speed change correction value FORCE (spd). In this slowdown requirement, the vehicle speed change correction value (vehicle speed integration section) NIN (spd) calculated by the equation (12) has the negative value.

Next, in a step SE2 corresponding to the above target output calculation means 94, similar to upon the acceleration judgment, the target output POWER is calculated by the relation represented by an equation (14) memorized in advance, based on the drive force FORCEDCL upon slowdown calculated by the target drive force calculation means 92 and the actual vehicle speed spd. Next, in a step SE3 corresponding to the above input shaft target rotation speed calculation means 96, the input shaft target rotation speed NINLINE upon slowdown is calculated by the relation represented by an equation (15) based on the actual initial target rotation speed value NINLINE0 upon slowdown judgment, the accelerator open-degree correction value NIN (pap), and the accelerator speed correction value NIN (dspd, pap).

In a step SE4 corresponding to the above target engine torque calculation means 98, the target engine torque TE is calculated similar to upon acceleration judgment, by the relation represented by the equation (10) memorized in advance, based on the target output POWER upon slowdown calculated by the above target output calculation means 94 and the input shaft target rotation speed NINLINE upon slowdown calculated by the above input shaft target rotation speed calculation means 96. As a result, the above input shaft target rotation speed NINLINE changes as shown in FIG. 20, while the target drive force FORCEDCL upon slowdown changes as shown in FIG. 21, respectively.

In the following, another embodiments of the present invention will be explained. Incidentally, in the following explanation, the elements common to that in the above embodiment are added the same reference numerals for omitting the detail explanation thereof.

Figure 28:
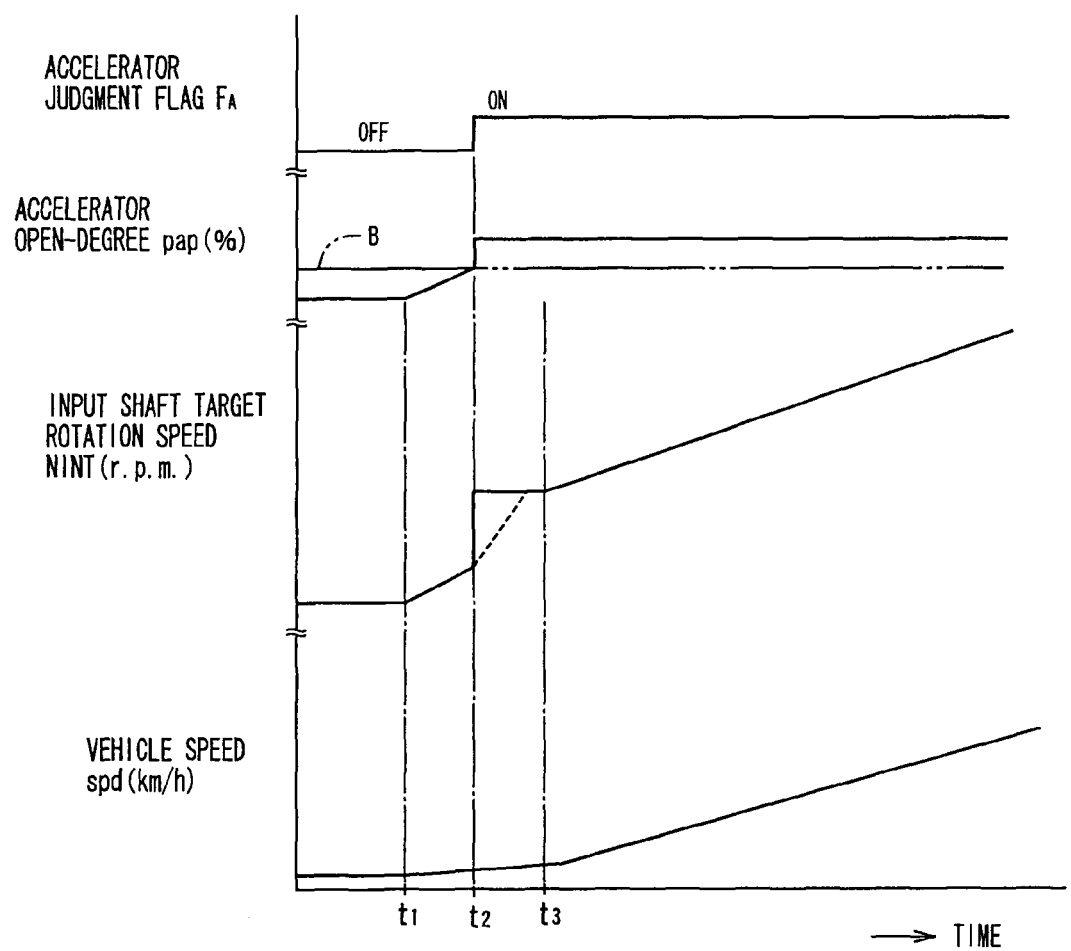
FIG. 28 is a time chart explaining the input shaft target rotation speed calculation operation upon the acceleration requirement judgment by the input shaft target rotation speed calculation means in another embodiment of the present invention.
Figure 29:
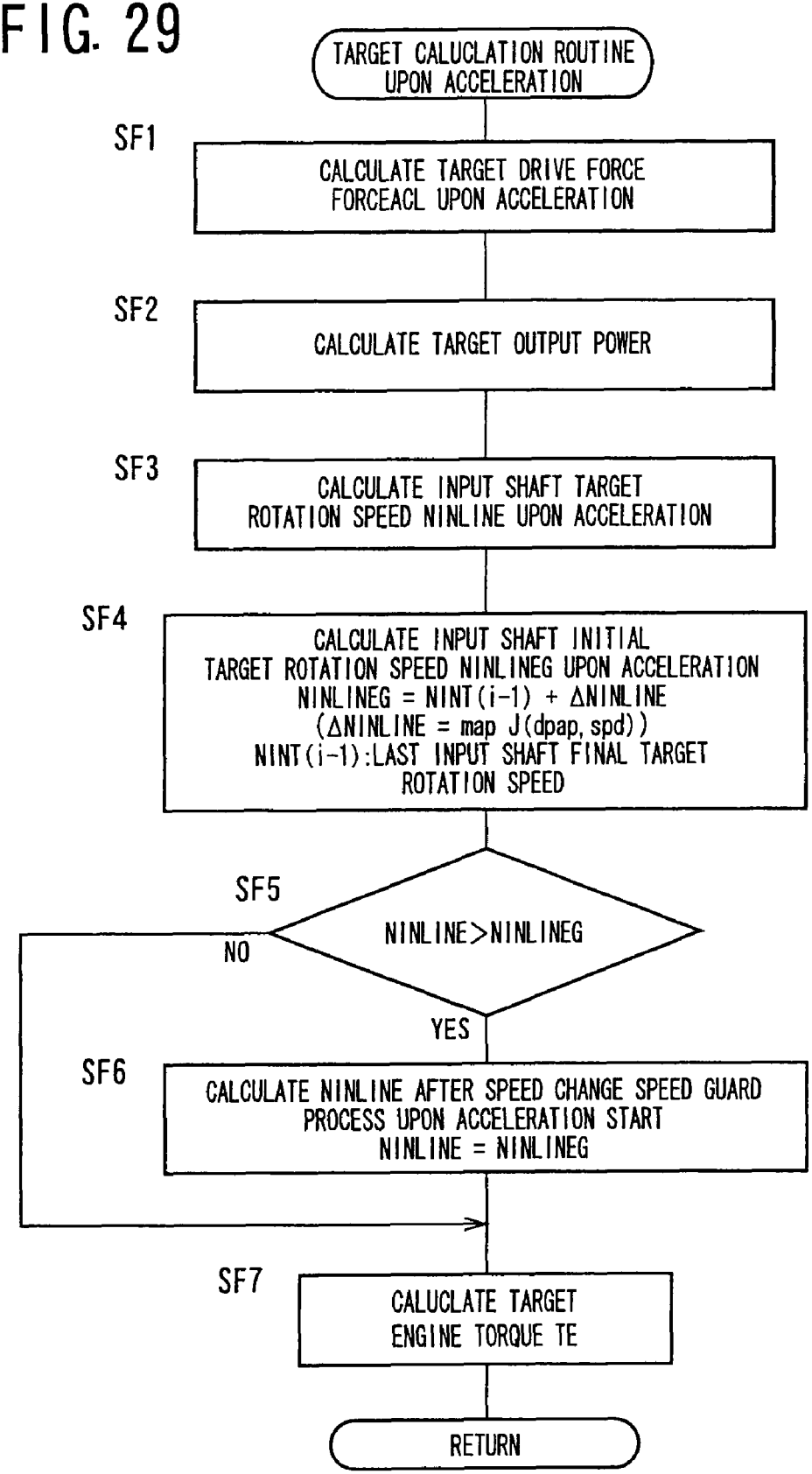
FIG. 29 is a flowchart explaining a main portion of the control operation of the electronic control device in the embodiment shown in FIG. 28.

FIG. 28 is a time chart explaining the control function upon acceleration requirement judgment of the above input shaft target rotation speed calculation means 96, and FIG. 29 shows a target calculation routine upon acceleration explaining the control function of the electronic control device 66 corresponding thereto. The input shaft target rotation speed calculation means 96 of this embodiment, in response to the judgment of the acceleration requirement operation (timing $t_2$) by the accelerator pedal 71, calculates the input shaft initial target rotation speed NINLINEG upon acceleration by the relation represented by an equation (16) and memorized in advance, based on the actual accelerator speed dpap and the vehicle speed spd. Here, a first section of a right side of an equation (16) means the last final input shaft target rotation speed, and it corresponds at the timing $t_2$ to the input shaft target rotation speed upon normal just before the acceleration requirement judgment.

A second section of a right side of the equation (16) is an added section to be added to the last value NINT (i−1) every control cycle, and it is determined by a relation J (dpap, spd) which increases as the accelerator speed dpap becomes larger, and increases as the vehicle speed spd becomes higher. The input shaft initial target rotation speed NINLINEG upon acceleration thus determined can be expressed as a transition input shaft target rotation speed NINT transitionally used upon acceleration requirement judgment.

The input shaft target rotation speed calculation means 96 in this embodiment compares the target rotation speed NINLINE upon acceleration calculated by the equation (8) with the above input shaft initial target rotation speed (transition input shaft target rotation speed) NINLINEG upon acceleration, to adopt the smaller value as the actual target input rotation speed. As a result, the input shaft target rotation speed NINLINEG shown by a broken line in FIG. 28 and changes gentler than the target rotation speed NINLINE upon acceleration calculated by the equation (8) and shown by the solid line, is used for the input shaft rotation speed control. With this, different from the case of using the target rotation speed NINLINE upon acceleration increasing uniformly and calculated by the equation (8), the favorable acceleration feeling corresponding to the accelerator speed dpap can be obtained.

$$NINLINEG = NINT(i-1) + \Delta NINLINE \quad (16)$$

Here, $\Delta NINLINE$=map value: J (dpap, spd), and

NINT (i−1) means the last final input shaft target rotation speed.

In this embodiment, as mentioned above, the transition target rotation speed NINLINEG is set for the input shaft target rotation speed NINLINE upon acceleration just after the judgment of acceleration requirement by the accelerator operation judging means 86 such that the input shaft rotation speed $N_{IN}$ of the continuously variable transmission 18 increases by the changing rate corresponding to the accelerator speed dpap (changing rate of the output requirement amount). As a result, the accelerating feeling corresponding to the various acceleration requirements by the driver can be obtained. That is, upon judgment of the acceleration requirement, the basic value upon acceleration requirement is calculated based on the accelerator open-degree pap.

Simultaneously, the transition target rotation speed NINLINEG gradually increasing from the initial value NINT (i−1) of the target rotation speed calculated is serially calculated, in accordance with the changing rate $\Delta NINLINE$ based on the changing degree (acceleration speed dspd) of the output requirement amount. Before the transition target rotation speed NINLINEG reaches the basic value NINLINE upon acceleration requirement, the transition target rotation speed NINLINEG is set as the target rotation speed NINLINE upon acceleration, and after the transition target rotation speed NINLINEG reaches the basic value NINLINE upon acceleration requirement, the basic value is set as the target rotation speed NINLINE upon the acceleration. For this reason, both the accelerating feeling in response to the output requirement amount and the accelerating feeling corresponding to the various acceleration requirement by the driver can be obtained.

In FIG. 29, a step SF1 corresponding to the above target drive force calculation means 92, a step SF2 corresponding to the above target output calculation means 94, and a step SF3 corresponding to the above input shaft target rotation speed calculation means 96 respectively perform the sequences in the same way as that in the steps SC1, SC2 and SC3. In a succeeding step SF4, the input shaft initial target rotation speed NINLINEG upon acceleration is calculated by the relation represented by the equation (16) and memorized in advance, based on the actual accelerator speed dpap and the vehicle speed spd. Next, in a step SF5, by the equation (8), whether the input shaft initial target rotation speed NINLINEG upon acceleration calculated in the above step SF4 is smaller than the input shaft target rotation speed NINLINE upon acceleration calculated in the above step SF3 or not, is judged.

Upon affirmation of the step SF5, in a step SF6 corresponding to the above input shaft target rotation speed calculation means 96, the input shaft initial target rotation speed NINLINEG upon acceleration is renewed as the input shaft target rotation speed NINLINE upon acceleration and in a step SF7 corresponding to the above target engine torque calculation means 98, the target engine torque TE is calculated based on the input shaft target rotation speed NINLINE upon acceleration. However, upon denial of the step SF5, the target engine torque TE is calculated based on the input shaft target rotation speed NINLINE upon acceleration calculated in the above step SF3. According to this embodiment, in addition to the above effects, the favorable accelerating feeling corresponding to the accelerator speed dpap can be obtained.

In addition to the above embodiments explained with reference to the drawings, the present invention can be carried out in other modes. For example, instead for the plural characteristic curves FORCE1 to FORCE5 shown in FIG. 7 arranged side by side with the upon normal target drive force FORCE as the parameter, plural characteristic curves pap1 to pap5 arranged side by side with the accelerator open-degree as the parameter can be employed.

In addition, in the above embodiments, even the constant value of the FORCE (pap, spd) and FORCE (spd) in the equation (5), and the NIN (spd) and NIN (dspd, pap) in the equation (8), or even absence thereof can render the their own values. Further, instead of the vehicle in the above embodiment in which the output torque of the engine 12 is controlled by the throttle valve control device 82, the output torque of the engine 12 can be controlled by a fuel injection amount control device. In addition, the road surface judging means 88 in the vehicle of the above embodiment is not necessarily provided but can be omitted.

Needless to say, the present invention can be carried out in various modes other than the mode explained in the specification and disclosed in the drawings, along the knowledge of the skilled person without departing the gist of the present invention.

The invention claimed is:

1. A controlling system of a vehicle provided with a continuously variable transmission, which calculates a target rotation speed calculated relative to an input shaft rotation speed of the continuously variable transmission and calculates a target output torque of a power source to achieve a target drive force calculated based on an output requirement amount and a vehicle speed, for controlling a speed change ratio of the continuously variable transmission based on the target rotation speed, comprising:
an acceleration requirement judging means for judging an acceleration requirement by a driver; and
a controlling means, upon judgment of the acceleration requirement by the acceleration requirement judging means, for setting a target drive force upon acceleration to be higher than the target drive force calculated, for further maintaining or decreasing the target drive force relative to an increase of the vehicle speed, for setting a target rotation speed upon acceleration higher than the target rotation speed calculated, and for increasing the target rotation speed with an increase of the vehicle speed by a predetermined gradient, to thereby control the speed change ratio of the continuously variable transmission and the output torque of the power source such that the target drive force set upon acceleration is achieved and the input shaft rotation speed of the continuously variable transmission coincides with the target rotation speed upon acceleration.

2. The controlling system of a vehicle provided with a continuously variable transmission according to claim 1, wherein the controlling means, upon judgment of the acceleration requirement by the acceleration requirement judging means, sets the target rotation speed upon acceleration such that the input shaft rotation speed of the continuously variable transmission increases as the output requirement amount becomes larger.

3. The controlling system of a vehicle provided with a continuously variable transmission according to claim 2, wherein the controlling means, just after judgment of the acceleration requirement by the acceleration requirement judging means, sets the target rotation speed upon acceleration such that the input shaft rotation speed of the continuously variable transmission increases by a change rate in response to a changing degree of the output requirement amount.

4. The controlling system of a vehicle provided with a continuously variable transmission according to claim 3, wherein the controlling means, upon judgment of the acceleration requirement by the acceleration requirement judging means, (i) calculates a basic target rotation speed upon acceleration based on the output requirement amount, and a transition target rotation speed upon acceleration gradually increasing from the target rotation speed calculated in accordance with a change rate based on the changing degree of the output requirement amount, (ii) sets the transition target rotation speed as the target rotation speed upon acceleration until the transition target rotation speed reaches the basic target rotation speed, and (iii) sets the basic target rotation speed as the target rotation speed upon acceleration after the transition target rotation speed reaches the basic target rotation speed.

5. The controlling system of a vehicle provided with a continuously variable transmission according to claim 4, wherein the controlling means (i) feedback-controls the input shaft rotation speed to coincide with the target rotation speed, and (ii) upon judgment of the acceleration requirement by the acceleration requirement judging means, increases a gain of the feedback control such that a deviation between the target rotation speed upon acceleration and the input shaft rotation speed falls within a predetermined value.

6. The controlling system of a vehicle provided with a continuously variable transmission according to claim 2, wherein the controlling means (i) feedback-controls the input shaft rotation speed to coincide with the target rotation speed, and (ii) upon judgment of the acceleration requirement by the acceleration requirement judging means, increases a gain of the feedback control such that a deviation between the target rotation speed upon acceleration and the input shaft rotation speed falls within a predetermined value.

7. The controlling system of a vehicle provided with a continuously variable transmission according to claim 3, wherein the controlling means (i) feedback-controls the input shaft rotation speed to coincide with the target rotation speed, and (ii) upon judgment of the acceleration requirement by the acceleration requirement judging means, increases a gain of the feedback control such that a deviation between the target rotation speed upon acceleration and the input shaft rotation speed falls within a predetermined value.

8. The controlling system of a vehicle provided with a continuously variable transmission according to claim 1, wherein the controlling means, just after judgment of the acceleration requirement by the acceleration requirement judging means, sets the target rotation speed upon acceleration such that the input shaft rotation speed of the continuously variable transmission increases by a change rate in response to a changing degree of the output requirement amount.

9. The controlling system of a vehicle provided with a continuously variable transmission according to claim 8, wherein the controlling means (i) feedback-controls the input shaft rotation speed to coincide with the target rotation speed, and (ii) upon judgment of the acceleration requirement by the acceleration requirement judging means, increases a gain of the feedback control such that a deviation between the target rotation speed upon acceleration and the input shaft rotation speed falls within a predetermined value.

10. The controlling system of a vehicle provided with a continuously variable transmission according to claim 1, wherein the controlling means (i) feedback-controls the input shaft rotation speed to coincide with the target rotation speed, and (ii) upon judgment of the acceleration requirement by the acceleration requirement judging means, increases a gain of the feedback control such that a deviation between the target rotation speed upon acceleration and the input shaft rotation speed falls within a predetermined value.

11. The controlling system of a vehicle provided with a continuously variable transmission according to claim 1, further comprising a re-acceleration judgment means for judging a re-acceleration requirement by the driver during the acceleration requirement, and
   wherein the controlling means, upon judgment of the re-acceleration requirement by the re-acceleration requirement judging means, further increases the target drive force set and further increases the target rotation speed upon acceleration set regardless of increase of the vehicle speed.

12. The controlling system of a vehicle provided with a continuously variable transmission according to claim 1, further comprising a slowdown judgment means for judging a slowdown requirement by the driver during the acceleration requirement, and
   wherein the controlling means, upon judgment of the slowdown requirement by the slowdown requirement judging means with a state of the target drive force being increased due to the judgment of acceleration requirement and the target rotation speed upon acceleration being set, gradually decreases the target drive force and gradually decreases the target rotation speed upon acceleration.

13. The controlling system of a vehicle provided with a continuously variable transmission according to claim 12, wherein the controlling means, upon judgment of the slowdown requirement by the slowdown requirement judging means with a state of the target drive force being increased due to the judgment of acceleration requirement and the target rotation speed being set, gradually decreases the target drive force upon acceleration toward the target drive force upon acceleration set upon judgment of the acceleration requirement in a predetermined mode.

14. The controlling system of a vehicle provided with a continuously variable transmission according to claim 1, further comprising a road surface judging means for judging whether a running road surface is a low friction coefficient road surface,
   wherein the controlling means, on a condition of the road surface judging means judging that the running road surface is not the low friction coefficient road surface upon the judgment of acceleration requirement, controls the speed change ratio of the continuously variable transmission and the output torque of the power source such that the target drive force set is achieved and the input shaft rotation speed of the continuously variable transmission coincides with the target rotation speed upon acceleration set.

15. The controlling system of a vehicle provided with a continuously variable transmission according to claim 1, wherein the controlling means causes the target rotation speed upon acceleration to increase by an initial value set in advance stepwise and then causes the target rotation speed upon acceleration to increase by a predetermined gradient with the increase of the vehicle speed.

16. The controlling system of a vehicle provided with a continuously variable transmission according to claim 1, wherein the controlling means feedback-controls a shift ratio of the continuously variable transmission such that deviation between the target rotation speed upon acceleration and an actual input shaft rotation speed becomes smaller, and increases a gain of the feedback-control temporarily during a transition period in which the deviation reaches a predetermined value.

17. The controlling system of a vehicle provided with a continuously variable transmission according to claim 2, wherein the controlling means feedback-controls a shift ratio of the continuously variable transmission such that deviation between the target rotation speed upon acceleration and an actual input shaft rotation speed becomes smaller and increases a gain of the feedback-control temporarily during a transition period in which the deviation reaches a predetermined value.

18. A controlling system of a vehicle provided with a continuously variable transmission, which calculates a target rotation speed calculated relative to an input shaft rotation speed of the continuously variable transmission and calculates a target output torque of a power source to achieve a target drive force calculated based on an output requirement amount and a vehicle speed, that controls a speed change ratio of the continuously variable transmission based on the target rotation speed, comprising:
   an acceleration requirement judging unit that judges an acceleration requirement by a driver; and
   a control unit, that upon judgment of the acceleration requirement by the acceleration requirement judging unit, sets a target drive force upon acceleration to be higher than the target drive force calculated, maintains or decreases the target drive force relative to an increase of the vehicle speed, sets a target rotation speed of acceleration higher than the target rotation speed calculated, and increases the target rotation speed with an increase of the vehicle speed by a predetermined gradient, to thereby control the speed change ratio of the continuously variable transmission and the output torque of the power source such that the target drive force set upon acceleration is achieved and the input shaft rotation speed of the continuously variable transmission coincides with the target rotation speed upon acceleration.

* * * * *